United States Patent [19]

Yoda et al.

[11] Patent Number: 5,386,504

[45] Date of Patent: Jan. 31, 1995

[54] INFORMATION DISPLAY APPARATUS HAVING MULTIWINDOW SYSTEM

[75] Inventors: Nobuhisa Yoda, Tokyo; Hiroshi Watanabe, Kawasaki; Takeshi Ogaki, Tokyo; Akinori Iwase, Yokosuka; Shiro Takagi, Yokohama, all of Japan

[73] Assignee: Kabushiki Kaisha Toshiba, Kawasaki, Japan

[21] Appl. No.: 68,225

[22] Filed: May 28, 1993

[30] Foreign Application Priority Data

May 29, 1992 [JP] Japan ................. 4-138750
May 29, 1992 [JP] Japan ................. 4-138751

[51] Int. Cl.⁶ ................................. G06F 13/00
[52] U.S. Cl. ........................ 395/157; 395/161
[58] Field of Search ............. 395/155, 157, 161, 650

[56] References Cited

FOREIGN PATENT DOCUMENTS 63-29525 2/1988 Japan .

OTHER PUBLICATIONS

Microsoft Windows User's Guide (Trademark of Microsoft Corporation 1990) pp. X, 25, 13-14, 32, 43, 48, 85, 120, 263-264, 398-399, 464, 476-478.
Adrian Nye, "The Definitive Guide to the X Window System", vol. 1, Xlib Programming Manual, O'Reilly & Associates Inc., Aug. 1988, p. 406 (Oct. 1990, version).
"The Definitive Guide to the X Window System", vol. 2, Xlib Reference Manual, O'Reilly & Associates, Inc., Oct. 1990, p. 283.

*Primary Examiner*—Heather R. Herndon
*Assistant Examiner*—Cliff Nguyen Vo
*Attorney, Agent, or Firm*—Cushman, Darby & Cushman

[57] ABSTRACT

An information display apparatus having a multiwindow system designed to achieve high speed image drawing without impairing the operability of the multiwindows. In this apparatus, a communication controller sets an exclusive mode discrimination flag when a request to do so is generated by an application program. The displaying capability for all other application programs is then suspended. If another application program then generates a request with respect to window management, the communication controller checks an application program management table. When the result of the check indicates that the request is generated by a suspended application program, the request is stored in a communication buffer and processing of the request is suspended unless the suspension of the processing is cancelled.

14 Claims, 19 Drawing Sheets

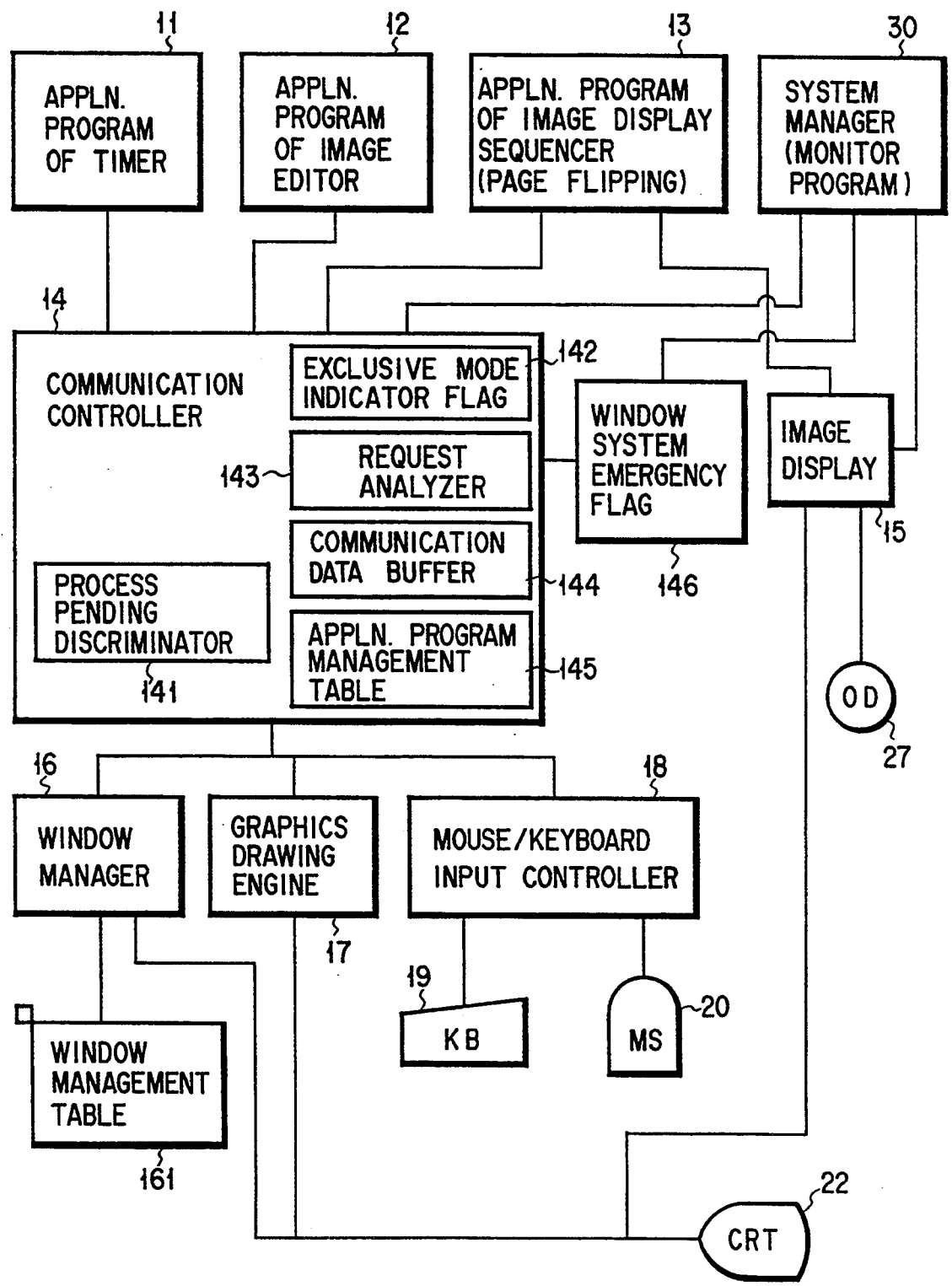
F I G. 1

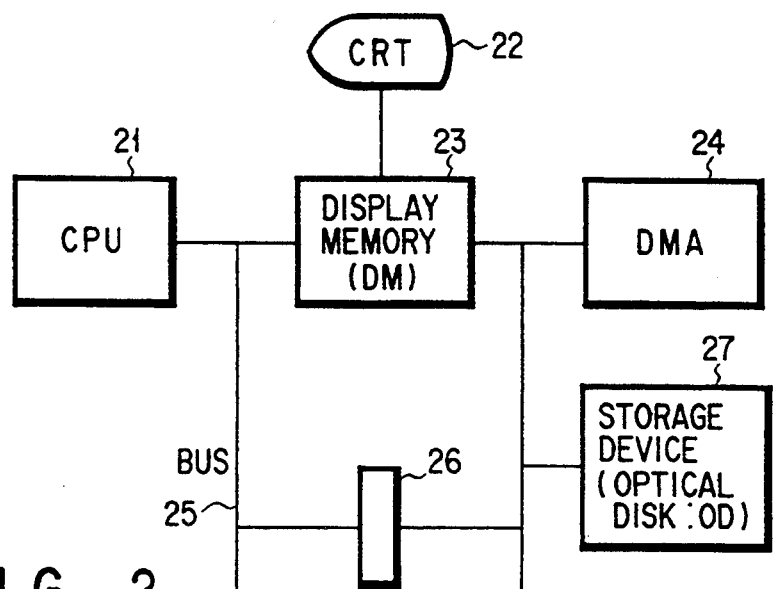
FIG. 2
| WINDOW ID | DISPLAY ORDER | WINDOW NAME | LEFT-TOP COORDINATE OF WINDOW | | WINDOW SIZE | |
|---|---|---|---|---|---|---|
| | | | X | Y | X | Y |
| 1 | 3 | EDIT IMAGE | 150 | 100 | 800 | 1100 |
| 2 | 2 | SEARCH TITLE LIST | 100 | 300 | 400 | 1200 |
| 3 | 1 | PAGE FLIPPING | 800 | 100 | 1000 | 1000 |
| 4 | 4 | TIMEPIECE | 1800 | 50 | 200 | 200 |
| 5 | 5 | SYSTEM MONITOR | 1200 | 20 | 600 | 100 |
FIG. 3
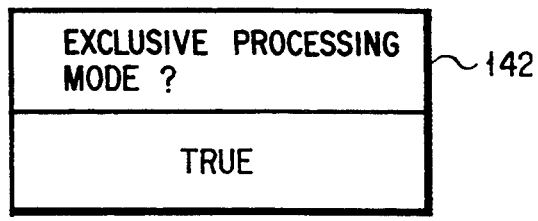
FIG. 4

| APPLN. PROGRAM IDENTIFIER | PROCESS PENDING INDICATOR FLAG | FIRST REQUEST WAITING TO BE PROCESSED | COMMUNICATION ADDRESS | APPLN. PROGRAM NAME |
|---|---|---|---|---|
| 1 | FALSE | | A | SYSTEM MANAGER |
| 2 | FALSE | | B | IMAGE EDITOR |
| 3 | TRUE | CREATE WINDOW (—) | C | TIMER |
| 4 | FALSE | | D | IMAGE DISPLAY SEQUENCER |
| ---- | ---- | ---- | ---- | ---- |

FIG. 5

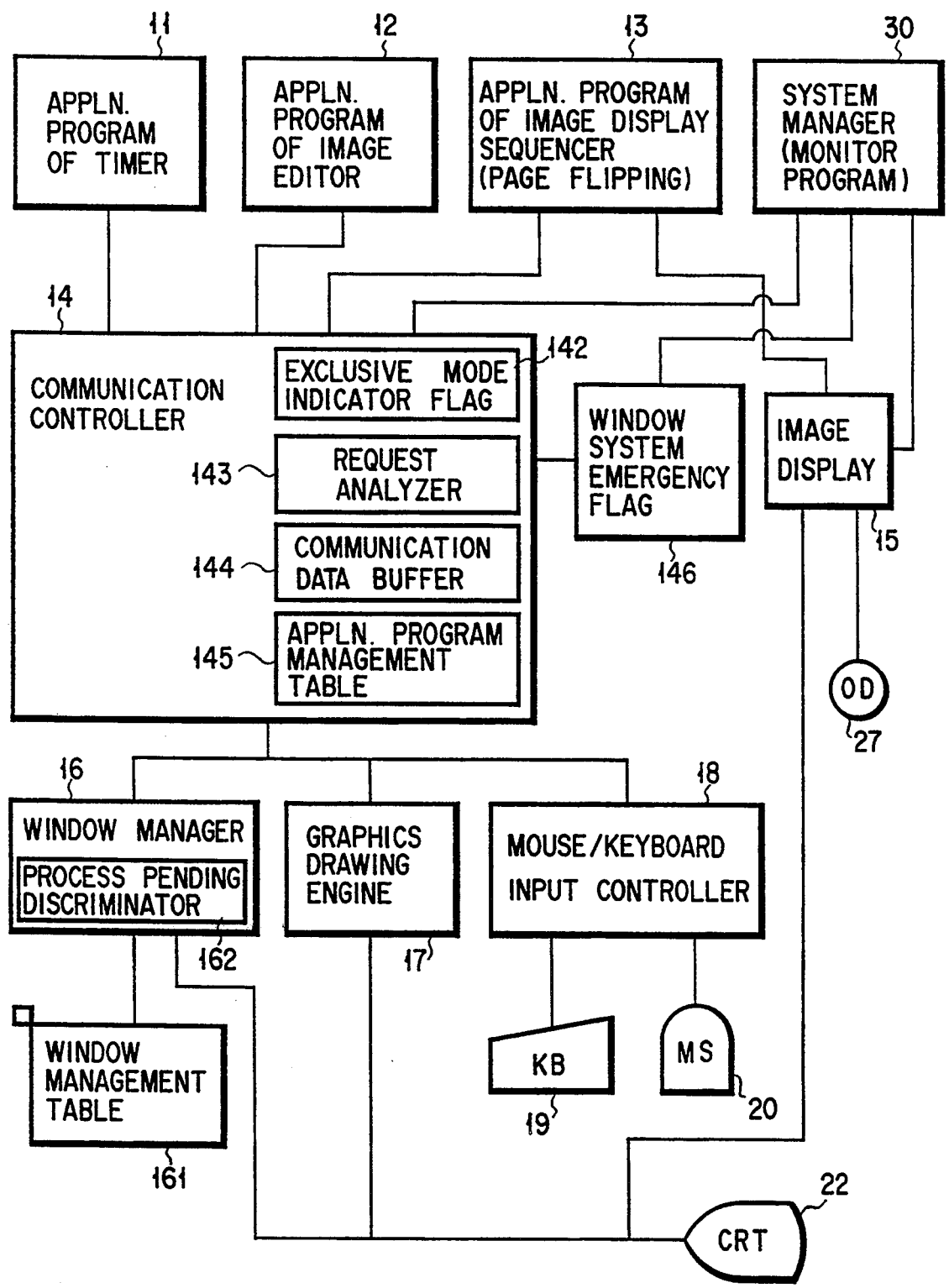
F I G. 13

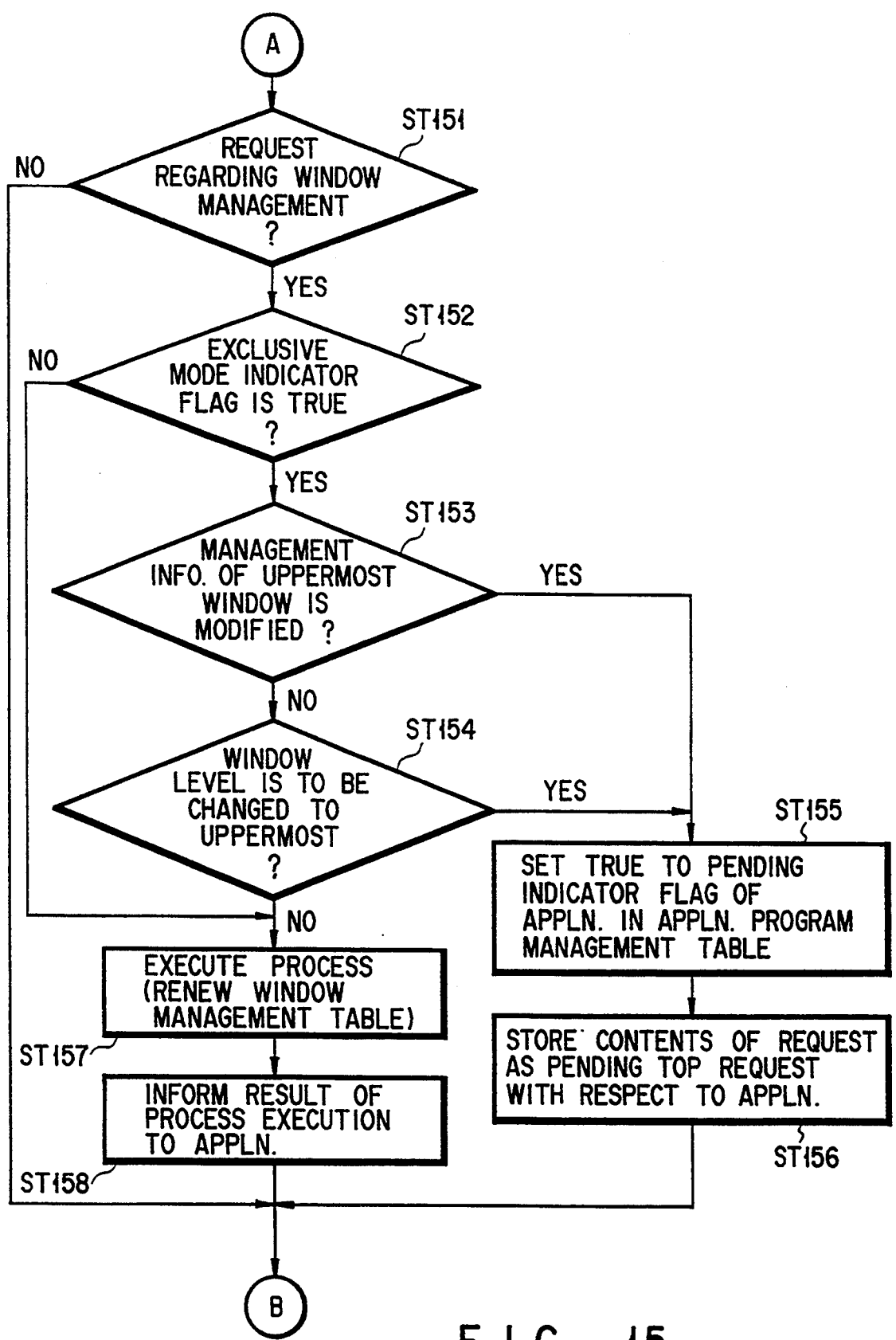
F I G. 15

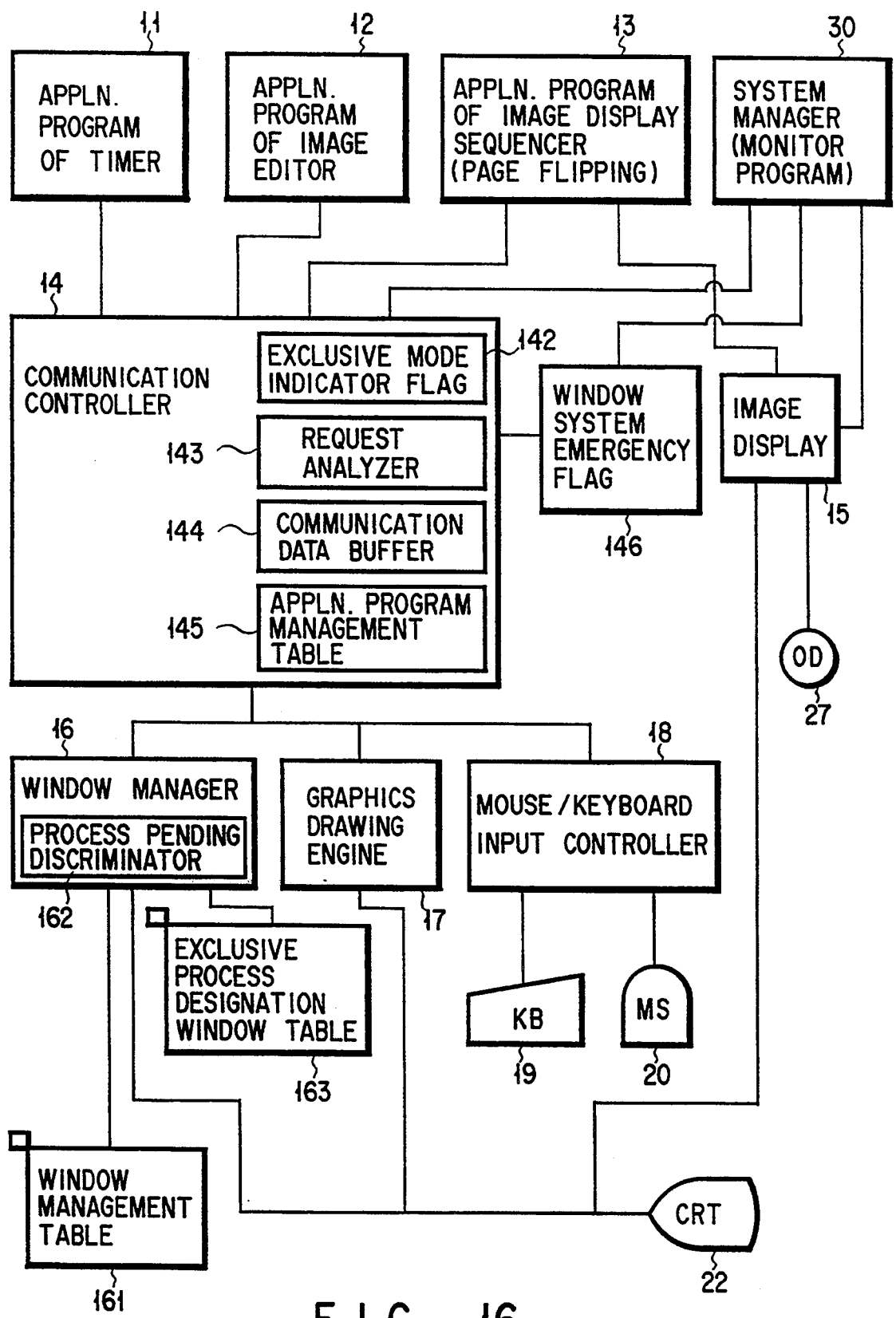
F I G. 16

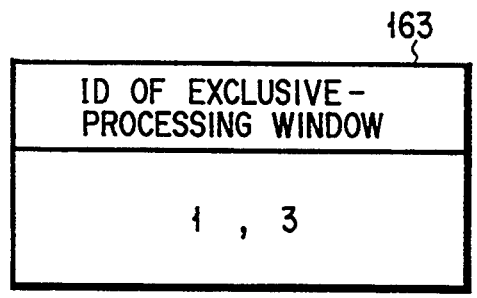
F I G. 17
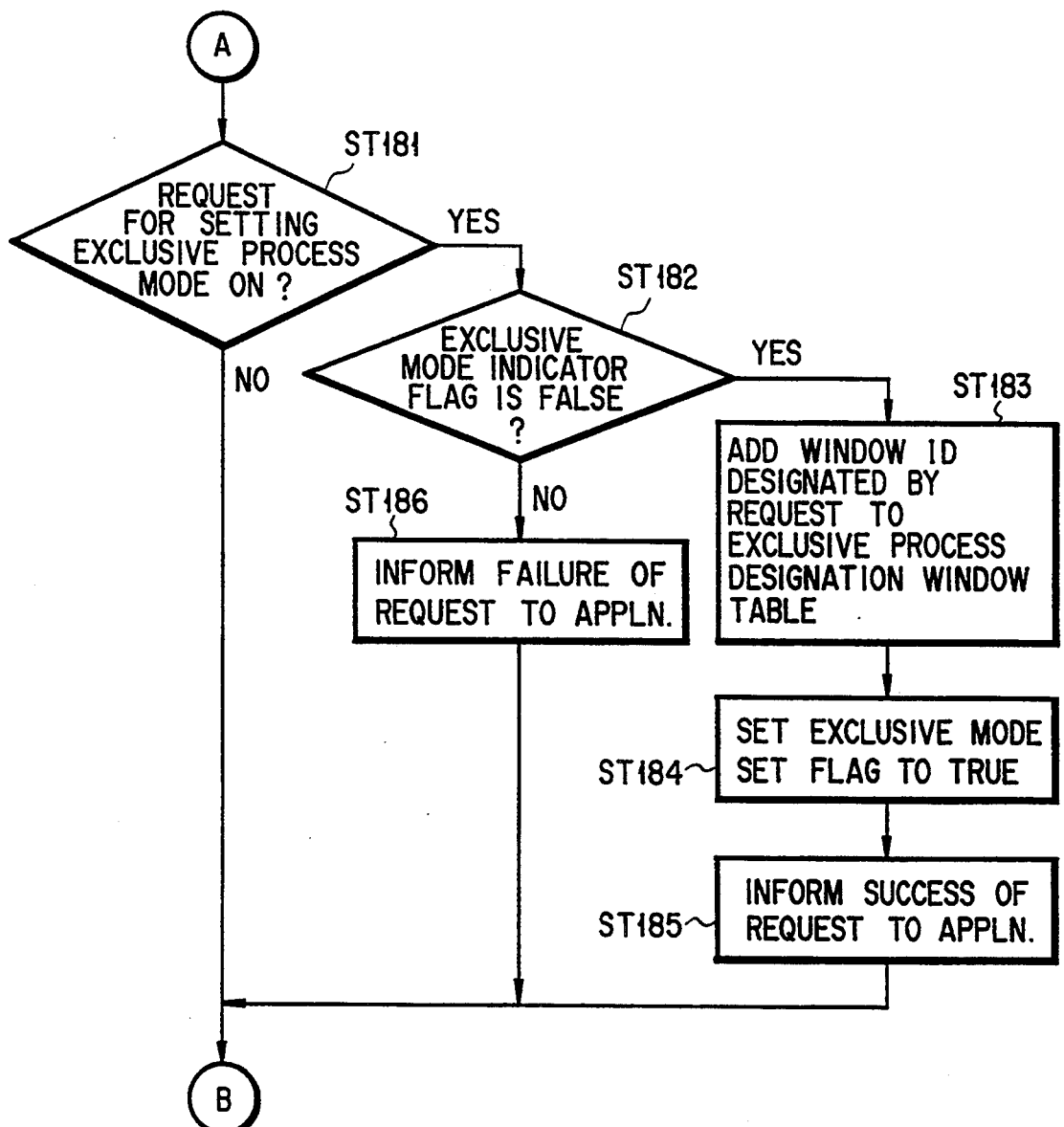
F I G. 18

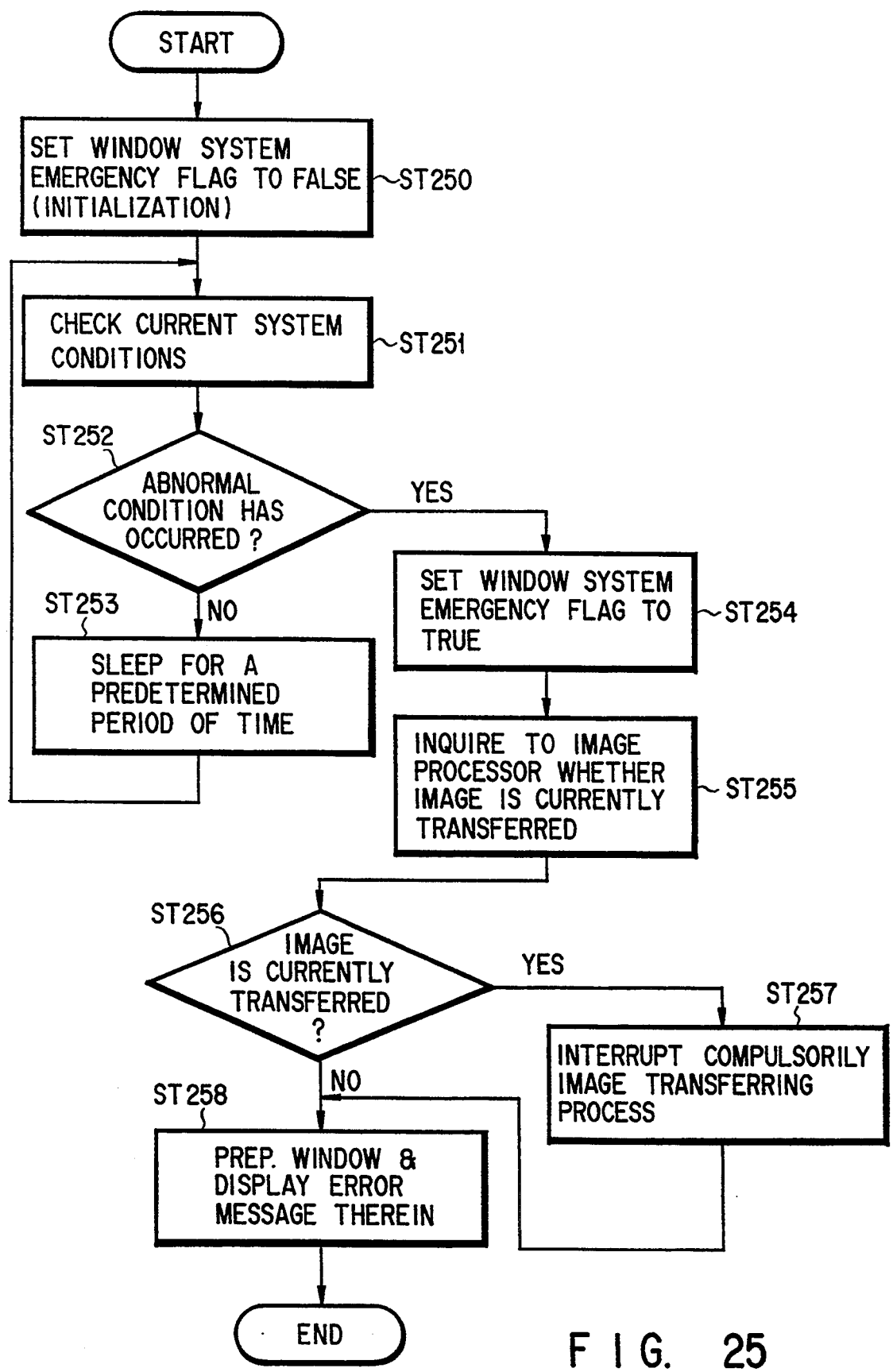
F I G. 25

INFORMATION DISPLAY APPARATUS HAVING MULTIWINDOW SYSTEM

BACKGROUND OF THE INVENTION

1. Field of the Invention

The present invention relates to an information display apparatus having a multiwindow system wherein outputs of display from a plurality of different programs being executed are respectively given to assigned window areas.

2. Description of the Related Art

Recently, an information display apparatus employing a multiwindow system is widely used. Such an information display apparatus is disclosed in Japanese Patent Disclosure (kokai) No. 63-29525, for example. In such an apparatus, a plurality of different programs are apparently executed simultaneously, and these programs respectively display their information at so-called windows which are areas designated on the display screen.

Such an information display apparatus is conventionally used in an electronic filing apparatus chiefly handing image data, thereby improving operability of filing work with respect to registering, searching, editing, etc., of document images.

The information display apparatus handing image data as mentioned above normally has a window manager for managing the display position and/or the size of windows provided for business applications of registering, searching, editing, etc., of document images.

More specifically, when a business application program of filing or the like displays a window, a window display request is sent from the business application program to the window manager via communication means. After the window manager receives the window display request, a window is displayed according to given parameters under conditions designated by the business application program.

Display environment of the window, such as a display order of stacked windows, can be modified according to respective requests from the business application program. For instance, by modifying the display environment, the display level of a specific window can be changed to the uppermost level (i.e., the top of the stacked windows).

Further, a request for changing the size or the display position of the window, generated from a mouse operation or keyboard operation by a user, is similarly processed via a mouse/keyboard input controller.

In an information display apparatus chiefly handling image data, such as a conventional electronic filing apparatus, images defined by image data are displayed on a display screen. Since the amount of data for producing the image is relatively large, a requirement as for the image producing speed is severer than the speed requirement in a multiwindow system chiefly handing universal code data.

Especially, when a page flipping (displayed images are sequentially and quickly switched) is performed, the speed requirement is a quite important factor.

When images are displayed in a conventional apparatus, image data is read from a recording medium such as an optical disk. Immediately thereafter, a video memory (VRAM) is directly accessed by a hardware (direct memory access controller; DMA), so that the read image data is written into a display memory (DM), without interaction of a CPU.

If a conventional multiwindow information display apparatus is simply used for an electronic filing apparatus, the window manager causes a problem.

More specifically, the window manager responds to the request from respective business application programs or to the request for changing the display position of the window(s) generated by the operator's mouse/keyboard operation with respect to each window.

For instance, there is a certain case wherein a business application program performs registering, searching, editing, etc., of documents, and a window assigned to the business application program has to be protected from being covered by other windows for a predetermined period of time.

As an example of the above filing business, assume a high speed page flipping function. Under this assumption, sending from the page flipping application program to the window manager is a request for displaying the page flipping window at the uppermost level. The window manager equally responding to each request of a plurality of application programs responds to that request, and the window management information is modified so that the page flipping window becomes the uppermost display level, thereby displaying that window at the uppermost level of the display screen.

At this time, the page flipping application program detects that the request to the window manager is successfully accepted, and the program proceeds its processing under assumption that the window is kept at the uppermost display level. In other words, the DMA is instructed to directly access the VRAM, so that the image data from the optical disk is sent to the uppermost window and the corresponding images are sequentially displayed in that window.

When the DMA performs drawing in the window according to an instruction from the business application program, however, there is no guarantee that the window is actually displayed at the uppermost level on the display screen. This is because there is a certain possibility that the window manager changes or modifies the display environment of the window at any time.

After responding to the above-mentioned request, assume a case wherein another application program requests to change the display order so that another window becomes the uppermost display level, or the operator instructs to set another window at the uppermost level using, for example, a mouse in his or her hand. In this case, since the window manager also responds to the program's request or the operator's instruction, the display level of the current window becomes no longer uppermost and the window could be covered by a new uppermost window.

If the display order of the current window is changed during the DMA transfer of image data to the VRAM, the DMA cannot detect that the destination memory location of transferring the image data is changed, unless the CPU interrupts the DMA transfer just at the time when the window display environment is changed or modified.

In this case, the frame of the window moves and, therefore, the image to be displayed within the window frame is displayed outside the window frame. Otherwise, the image data transfer has to be interrupted each time the window display order is changed, thus disturbing efficient page flipping function.

Similar problems will occur not only when the display order of the windows are changed but also when the size of the window or the display position of the window is changed.

In order to avoid the above problems, according to a prior art, after responding to a request from an application program (client), a window manager suspends the request(s) from application program(s) other than the program (client) sending the former request. Such a suspension function is called a window management occupation function.

Even during the page flipping display, however, the control to all of the windows is stopped. Then, the business operation in other windows cannot be proceeded.

Moreover, the above function is basically designed to be active for a quite short period of time (less than a few seconds). However, if the request is executed, the image drawing processing executed in other windows is stopped. For this reason, the above window management occupation function is not suitable for use with a page flipping function which continues its processing for a relatively long period of time (several tens of seconds).

As mentioned above, if a page flipping function requiring high speed image data processing is realized in a prior art information display apparatus applied to an electronic filing apparatus, the operability of a multi-window system could be impaired, thus causing practical problems.

In addition, according to a conventional information display apparatus adapting a multiwindow system, it is necessary to occupy the process of window displaying and image drawing. Therefore, when the process is occupied by a specific application program, various problems could occur.

For instance, if a system error occurs during a specific application program occupies (grabs) the window manager, it is impossible to display even an error message on the display screen unless the specific program currently occupying the window manager can detect the error. In such a case, it is too late to find out the occurrence of error, thereby possibly destroying data of a user of the apparatus.

Thus, a prior art information display apparatus has difficulty as for the countermeasure to emergency cases occurring when a specific application program takes a position to occupy the window manager or actually occupies it.

As has been mentioned above, according to a prior art, it is difficult to obtain a multiwindow environment having a good operability when high speed processing such as a page flipping function is to be realized.

SUMMARY OF THE INVENTION

It is accordingly an object of the present invention to provide an information display apparatus having an easy-to-use multiwindow system by which high speed image drawing required to a page flipping display or the like can be achieved while keeping a high operability of the multiwindow.

To achieve the above object, the information display apparatus of the present invention, provided with a first application program generating a first request for achieving a first function and a second application program generating a second request for achieving a second function, comprises: means for executing processes corresponding to the first request generated by the first application program and the second request generated by the second application program; display means, having a first window with a first display environment and a second window with a second display environment, for displaying in the first window a first result obtained by executing the first application program, and displaying in the second window a second result obtained by executing the second application program; window manager means for managing the first display environment of the first window and the second display environment of the second window in the displaying means; mode setting means for setting at the window manager means a suspending mode for suspending a third request for modifying the first display environment of the first window, and suspending a fourth request, generated after the third request, for executing a process generated by either of the first application program and the second application program which has generated the third request; and control means, when the third request for modifying the first display environment of the first window of the window manager means is suspended, for controlling the display means so as to display in the first or second window a result of executing the process corresponding to the fourth request generated by the first or second application program which is not suspended.

The information display apparatus of the present invention, provided with a first application program generating a first request for achieving a first function and a second application program generating a second request for achieving a second function, also comprises: means for executing processes corresponding to the first request generated by the first application program and the second request generated by the second application program; display means, having a first window with a first display environment and a second window with a second display environment, for displaying in the first window a first result obtained by executing the first application program, and displaying in the second window a second result obtained by executing the second application program; window manager means for managing the first display environment of the first window and the second display environment of the second window in the displaying means; mode setting means for setting at the window manager means a suspending mode for suspending a third request for modifying the first display environment of the first window, and suspending a fourth request, generated after the third request, for executing a process generated by either of the first application program and the second application program which has generated the third request; control means, when the third request for modifying the first display environment of the first window of the window manager means is suspended, for controlling the display means so as to display in the first or second window a result of executing the process corresponding to the fourth request generated by the first or second application program which is not suspended; means for holding a process request including a request for changing the first display environment of the first window; and means for activating the executing means so as to execute the process request held by the holding means in an order of holding performed by the holding means.

The information display apparatus of the present invention wherein input or output information of a plurality of simultaneously executed application programs can be selectively displayed in a plurality of windows which are partially or fully overlapped one another, comprises: means for processing a request for modifying a display environment of the windows corresponding to the executed application programs; occupation allowing means for, after the processing means receives another request for modifying the display environment of the windows from a different application program other than the executed application programs, suspending all requests from the different application program, and allowing the executed application programs to occupy the windows; and means for cancelling occupation of the windows allowed by the occupation allowing means in accordance with occurrence of an emergency matter.

The information display apparatus of the present invention wherein input or output information of a plurality of simultaneously executed application programs can be selectively displayed in a plurality of windows which are partially or fully overlapped one another, comprises: means for processing a request for modifying a display environment of the windows corresponding to the executed application programs; occupation allowing means for, after the processing means receives another request for modifying the display environment of the windows from a different application program other than the executed application programs, suspending all requests from the different application program, and allowing the executed application programs to occupy the windows; and means for, when there is occupation of the windows allowed by the occupation allowing means, temporarily cancelling the occupation of the windows in accordance with occurrence of an emergency matter so as to suspend processing for a request from the executed application programs.

The information display apparatus of the present invention wherein input or output information of a plurality of simultaneously executed application programs can be selectively displayed in a plurality of windows which are partially or fully overlapped one another, comprises: means for processing a request for modifying a display environment of the windows corresponding to the executed application programs; occupation allowing means for, after the processing means receives another request for modifying the display environment of the windows from a different application program other than the executed application programs, suspending all requests from the different application program, and allowing the executed application programs to occupy the windows; and means for, when there is occupation of the windows allowed by the occupation allowing means, temporarily cancelling the occupation of the windows in accordance with occurrence of an emergency matter so as to display all of the windows.

The information display apparatus of the present invention wherein input or output information of a plurality of simultaneously executed application programs can be selectively displayed in a plurality of windows which are partially or fully overlapped one another, comprises: means for processing a request for modifying a display environment of the windows corresponding to the executed application programs; occupation allowing means for, after the processing means receives another request for modifying the display environment of the windows from a different application program other than the executed application programs, suspending all requests from the different application program, and allowing the executed application programs to occupy the windows; and means for, when there is occupation of the windows allowed by the occupation allowing means, temporarily cancelling the occupation of the windows in accordance with occurrence of an emergency matter so as to process all suspended requests from the application program.

According to the invention having the above means, an efficient data transfer can be performed under the background of a user's manipulation, thus eliminating influence of high speed data transfer onto the display environment of the window.

Further, if an emergency matter occurs, this matter can be displayed with a top priority, thus enabling a quick response to the emergency matter without affecting to the display environment of the window during high speed data transferring.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 schematically shows a software configuration of an information display apparatus according to a first embodiment of the present invention;

FIG. 2 is a block diagram schematically showing a hardware configuration of the information display apparatus for achieving a sequential image display function (page flipping);

FIG. 3 shows an example of the contents of a window management table;

FIG. 4 shows an example of an exclusive mode discrimination flag;

FIG. 5 shows an example of the contents of an application program management table;

FIG. 13 schematically shows a software configuration of an information display apparatus according to a second embodiment of the present invention;

FIG. 15 is a flow chart for explaining a process flow in the exclusive process mode;

FIG. 16 schematically shows a software configuration of an information display apparatus according to a third embodiment of the present invention;

FIG. 17 shows an example of the contents of an exclusive processing designation window table;

FIG. 18 is a flow chart for explaining an essential part of a process flow of the exclusive process mode setting;

FIG. 25 is a flow chart for explaining a process flow of a system management application program.

DETAILED DESCRIPTION OF THE PREFERRED EMBODIMENTS

Figure 6:
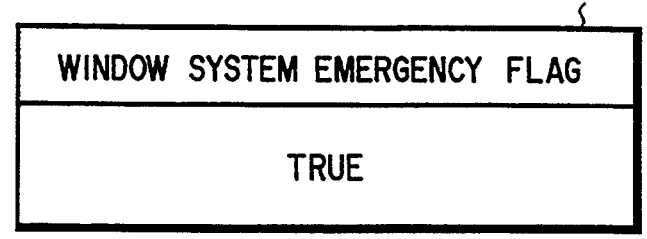
FIG. 6 shows an example of a flag indicating occurrence of an emergency matter in the window system.

In the following, a preferred embodiment of the present invention will be described with reference to the accompanying drawings.

FIG. 1 schematically shows an information display apparatus adapting a multiwindow system according to the present invention.

More specifically, the total construction of the apparatus is divided into two functional blocks: one is constituted by parts 11 to 13 of the application program (AP), and the other is constituted by parts 14 to 18 which execute processing corresponding to the requests sent from application programs 11 to 13.

The apparatus is also provided with system management (monitoring) program 30 for monitoring the system condition using LAN (Local Area Network) communication.

Time display application program 11 displays on the display screen a timepiece showing the system clock. The displayed contents of the timepiece are renewed by this program for each predetermined time interval.

Image edit application program 12 provides to an operator a specific environment for interactively editing images of image data on the display screen.

Sequential image display (page flipping) application program 13 sequentially displays images of image data within a prepared window in a page flipping manner.

During the page flipping display, a hardware such as a DMA controller is used for achieving high speed image data transfer processing. Details of this application program will be described later.

Communication controller 14 has functions for receiving display requests from respective application programs 11 to 13 and/or from system management program 30, for transmitting results of various processing, and for controlling a request for the processing.

Communication controller 14 includes the following subcomponents. That is, process pending discriminator 141 discriminates whether or not the process request from a specific application program is suspended.

Exclusive mode (process occupation) indicator flag 142 is used for managing whether or not the apparatus is in a exclusive process mode (which will be described later). More specifically, this flag indicates whether the process request from a specific application program occupies the system including window manager 16. (For example, the flag "TRUE" indicates the occupation, and the flag "FALSE" indicates the nonoccupation.)

Incidentally, the initial default of exclusive mode indicator flag 142 is set to "FALSE."

Note that the above-mentioned "exclusive process mode (process occupation)" represents a function that when processing corresponding to a request from a specific application program is currently performed, other process request(s) from other application program(s) is(are) suspended in order that the control of the system is occupied until the processing of the former request is completed.

Request analyzer 143 analyzes each process request from application programs 11 to 13 and system management program 30 so as to detect the content of the request.

Communication buffer 144 temporarily holds (or stores) the process request(s) sent as communication data from respective application programs 11 to 13 and system management program 30.

Application program management table 145 is used for managing the information indicating the conditions of execution of currently executed individual application programs 11 to 13 and system management program 30, the information with respect to the application program(s) to be suspended, and the request(s) to be processed first when the suspension of the to-be-suspended application program(s) is released or cancelled.

Window system emergency flag 146 is set in response to the request from above-mentioned system management program 30, so that communication controller 14 is informed of an abnormal state (error) occurred in the system.

Normally, flag 146 is set to "FALSE," but is set to "TRUE" only if an emergency matter has occurred in the system.

Image display 15 controls display processing wherein in response to an instruction from sequential image display application program 13, for example, image data is sent to the display memory (DM) using high speed data transferring means such as a direct memory access (DMA) controller (which will be described later), and the image of the sent image data is displayed within the specific window on the screen of CRT 22.

In this case, for example, the image data is stored in the storage device or optical disk (OD) 27. Thus, the image data transfer is performed from optical disk OD 27 to the display memory DM.

Window manager 16 manages the display environment of one or more windows displayed on the screen of CRT 22. More specifically, manager 16 uses information necessary to manage the display conditions of windows, such as information with respect to identification codes of the respective windows, information with respect to positions/sizes of the respective windows, information with respect to the order of overlapping the respective windows, etc., managed by window management table 161. Then, manager 16 prepares a new window, deletes the unnecessary window(s), modifies the display environment of the window(s), and so on.

Graphics (including characters) drawing engine 17 executes all drawing processes on the screen of CRT 22, except for the image data transfer by the DMA.

Mouse/keyboard input controller 18 controls the operator's input from keyboard (KB) 19 or from mouse (MS) 20. For instance, when the operator's input is the key input from keyboard KB 19, controller 18 determines which one of the displayed windows has to accept the key input. Then, controller 18 performs the control of transferring the key input data to the destination application program.

FIG. 2 schematically shows a hardware configuration for achieving the sequential image display (page flipping) function.

More specifically, the hardware is constituted by CPU 21 for governing the total control of the apparatus, CRT 22, display memory DM 23, DMA 24, bus 25, bus controller 26, and optical disk OD 27.

Display memory DM 23 is the memory area to which the image data to be displayed on CRT 22 is written.

Under the control of CPU 21, DMA 24 reads image data from optical disk OD 27 and writes the read image data into the specified or designated area on display memory DM 23.

Bus controller 26 controls the data flow of bus 25. For instance, when CPU 21 sets parameters to DMA 24, the connection of bus 25 is switched so that necessary data is transferred from CPU 21 to DMA 24.

FIG. 3 shows an example of the contents of window management table 161.

Table 161 is managed by above-mentioned window manager 16, and is constituted by five items for at least each window: a window ID (identifier); a display order; a window name; the start position of a window to be displayed; and a window size.

The item "1" of the window display order indicates the uppermost level, or it means that the window is displayed at the top on the screen. As the numeric value of the display order increases, the display level of the window is lowered so that the low level window is displayed under the higher level window.

FIG. 4 shows an example of exclusive mode indicator flag 142.

Flag 142 is managed by communication controller 14, and the exclusive process mode is set when flag 142 is set at, for example, "TRUE."

In the exclusive process mode, when an application program(s) other than the exclusive process mode requested application program requests an execution with respect to the processing of window manager 16 or requests a modification of the exclusive process mode, the processing of all subsequent requests, inclusive of the requests from the application program(s) other than the application program which has requested to set the exclusive process mode, is suspended.

After all, during the exclusive process mode, a modification of the window display environment by an application program(s) other than the exclusive process mode requested application program is inhibited.

Incidentally, aforementioned application program management table 145 is used for determining which application program executes its processing and which application program(s) suspends its(their) processing.

Further, when the setting (TRUE) of the exclusive process mode is cancelled, its flag is set to "FALSE."

FIG. 5 shows an example of the contents of application program management table 145.

Table 145 contains information with respect to the currently executed application program(s) which displays a window(s) on CRT 22. Table 145 includes the following items: an application program identifier; address information (communication address) necessary to communicate with the application program; a process pending indicator flag indicating that a request for processing the application program is suspended or pending; a request for the top of pending in which described is the content of processing to be executed first when the suspension of the request from the pending or suspended application program is cancelled; and a column for listing the application name(s) corresponding to the identifier(s).

More specifically, described in the item of a request for the top of pending process is the request causing to suspend the process request from an application program, or is the content of the request to be processed first with respect to the application program at the time when the suspension is cancelled.

FIG. 6 shows an example of window system emergency flag 146.

Flag 146 is normally set to "FALSE", and the system is informed of occurrence of an abnormal condition (emergency case) by "TRUE" thereof.

Flag 146 is initialized (set to "FALSE") by system management program 30 and is set to "TRUE" by system management program 30 when an emergency matter occurs.

Then, flag 146 is periodically monitored by communication controller 14, and the occurrence of the abnormal condition is confirmed by detecting "TRUE" of this flag.

In the following, the operation of the above-mentioned configuration will be explained.

Figure 7:
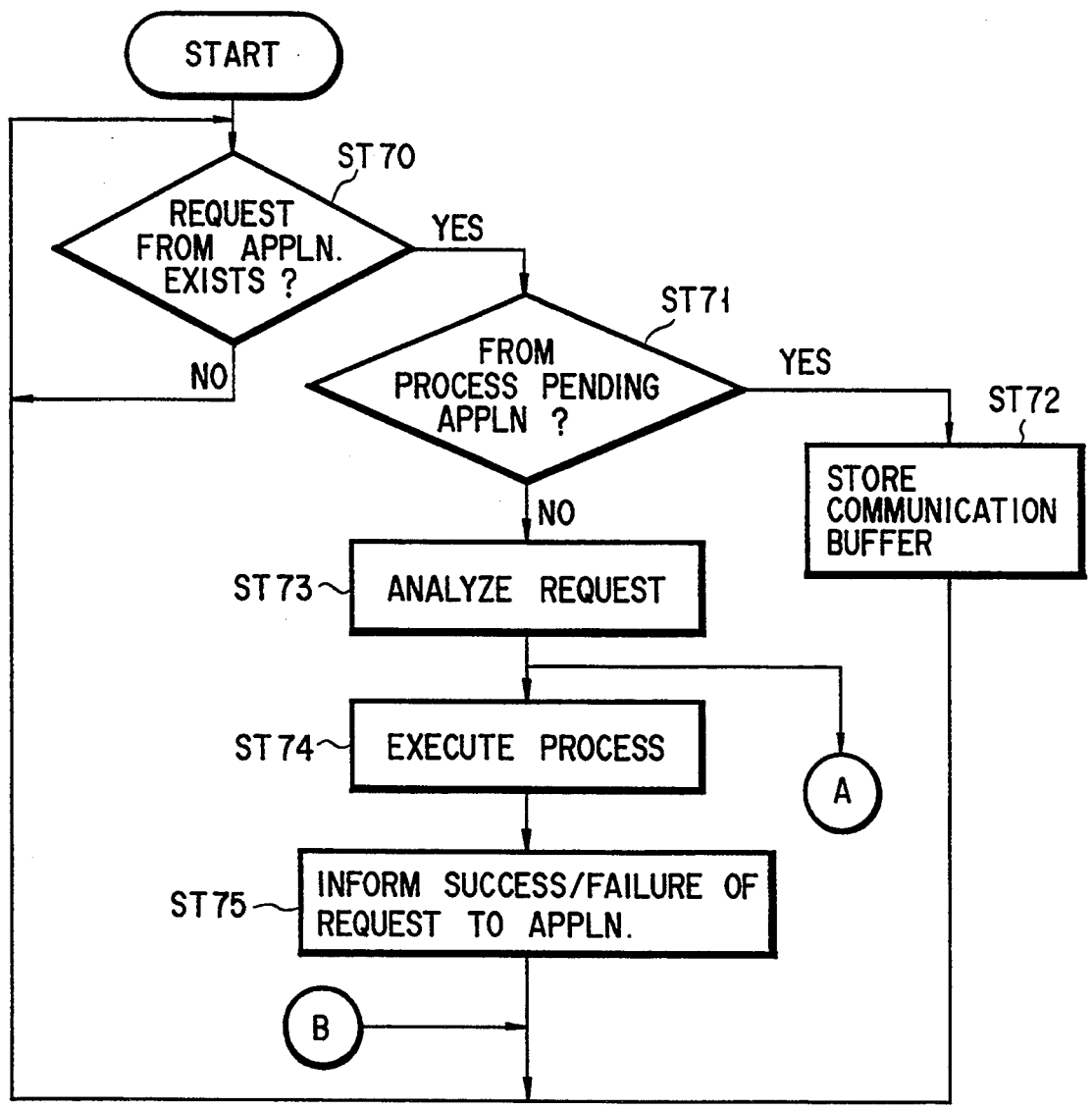
FIG. 7 is a flow chart for explaining a basic process flow of the communication controller.

FIG. 7 is a flow chart for briefly showing the process for a request generated from an application program.

When the system is initialized, communication controller 14 waits for receiving a process request from an application program (ST70, NO).

When a process request is generated from an application program (ST70, YES), communication controller 14 refers to application program management table 145 in order to check whether or not this process request is generated by an application program whose process is to be pending or suspended (ST71).

If the process pending indicator flag of the application program specified by application program management table 145 is set at "TRUE" (ST71, YES), communication controller 14 stores (without analyzing) the process request in communication buffer 144 (ST72) and waits for the next process request.

If the flag of application program management table 145 is set at "FALSE" (ST71, NO), request analyzer 143 in communication controller 14 analyzes the content of the received process request (ST73). Then, analyzer 143 determines whether the received process request indicates a process with respect to the window management, a process with respect to the graphics drawing, a process with respect to control of the input device, or the like.

When the result of the analysis indicates that the process request relates to a window management, communication controller 14 sends the process request to window manager 16; when it indicates that the process request relates to graphics drawing, communication controller 14 sends the process request to graphics drawing engine 17; and when it indicates that the process request relates to an input device control, communication controller 14 sends the process request to mouse/keyboard input controller 18 (ST74).

Thereafter, manager 16, engine 17, or controller 18, receiving the request from communication controller 14, executes given processing and returns the result of the processing to communication controller 14.

Communication controller 14 receiving the result of the processing checks whether or not the requested processing is successfully completed based on the received result, and the application program which has sent the process request is informed of the result of checking by controller 14 (ST75).

After informing the success/failure of processing, communication controller 14 waits for reception of a new subsequent process request(s).

In this case, communication controller 14, window manager 16, graphics drawing engine 17, and mouse/keyboard input controller 18 are not necessarily operated in a sequential manner. They can be operated independently unless they must be operated synchronously.

Respective application programs 11 to 13 can operate independently, and the number of application programs connected to communication controller 14 is variable. The maximum number of them depends on the memory area size available to application program management table 145 as well as on the communication capacity of the whole system, and this number is determined at the time of system initialization.

Figure 8:
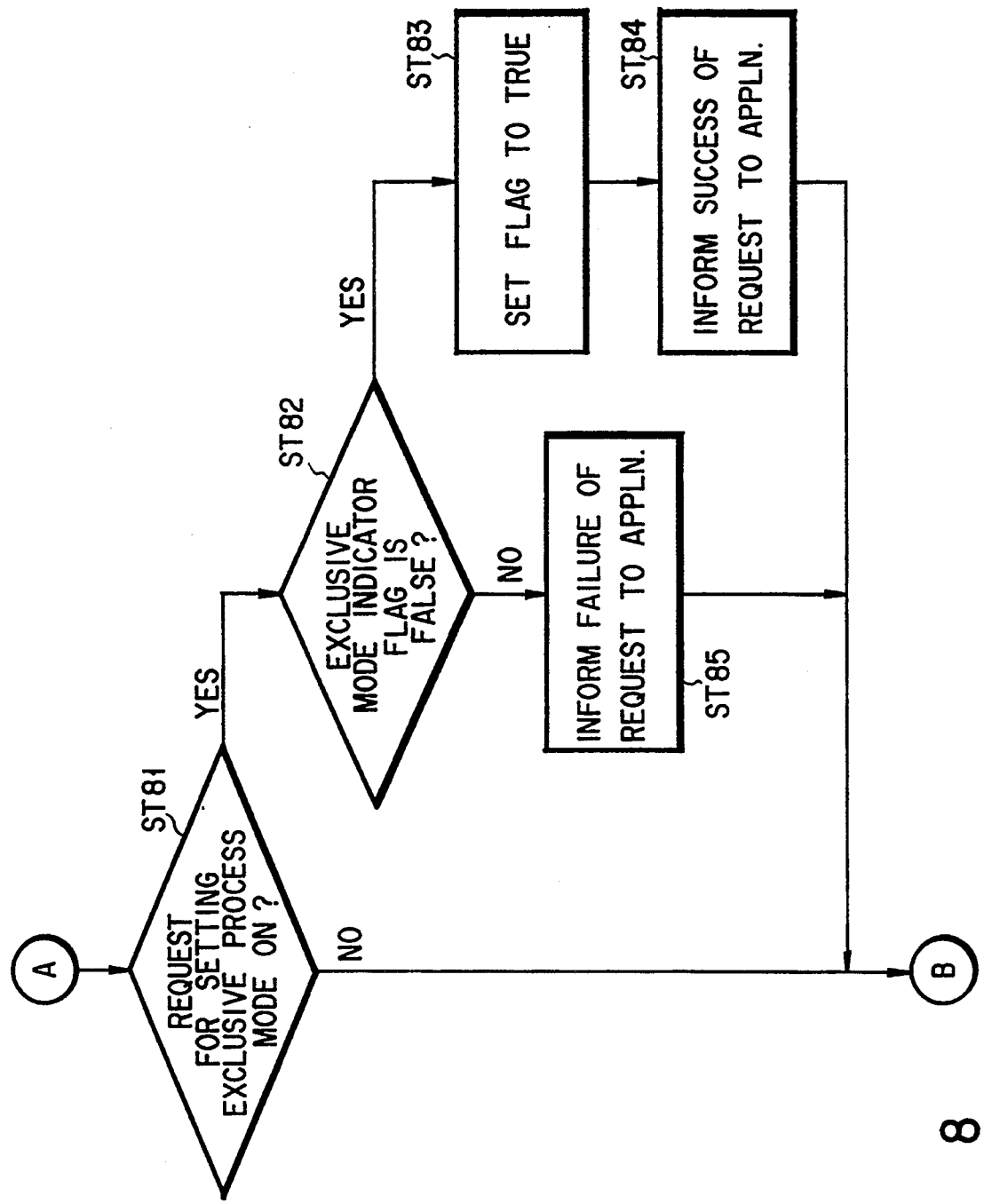
FIG. 8 is a flow chart for explaining an essential part of a process flow of the exclusive process mode setting.

FIG. 8 shows a flow of setting an exclusive process mode.

Request analyzer 143 in communication controller 14 analyzes the process request from an application program. According to the result of the analyzation, if it is detected that the content of the process request requires the turn-on of the exclusive process mode setting (ST81, YES), communication controller 14 refers to the condition of exclusive mode indicator flag 142.

If indicator flag 142 is currently set at "FALSE" (ST82, YES), communication controller 14 sets indicator flag 142 to "TRUE" (ST83). Then, the application program which has requested the process is informed of the success of processing (ST84).

On the other hand, if indicator flag 142 is currently set at "TRUE" (ST82, NO), communication controller 14 notifies the failure of processing to the application program which has requested the process (ST85).

Figure 9:
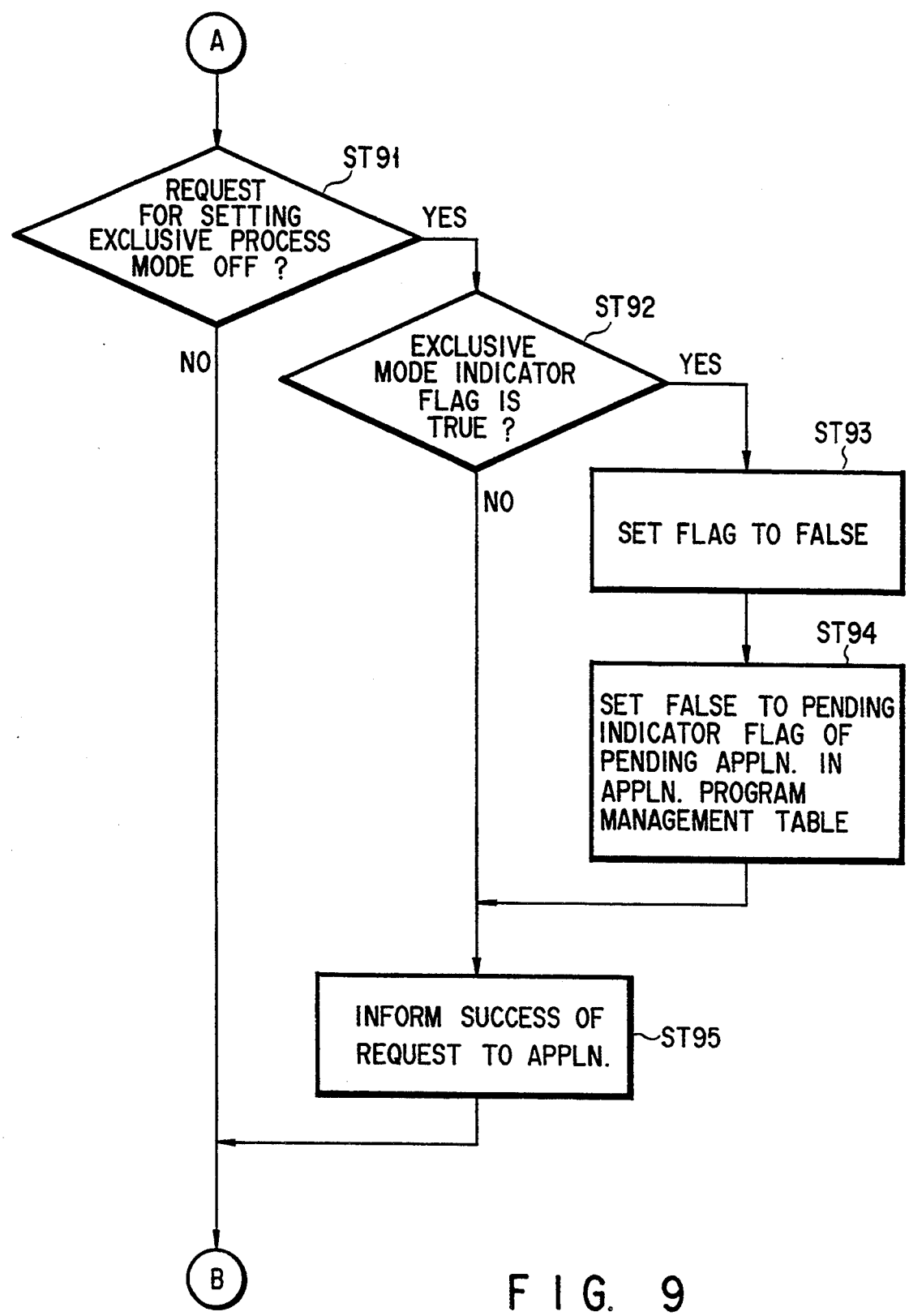
FIG. 9 is a flow chart for explaining an essential part of a process flow of cancelling the exclusive process mode setting.

FIG. 9 shows a flow of cancelling the exclusive process mode.

The process request from the application program is analyzed by request analyzer 143 in communication controller 14. When the result of the analyzation indicates a request for setting the turn-off of the exclusive process mode (ST91, YES), communication controller 14 refers to the content of exclusive mode indicator flag 142.

If indicator flag 142 is set at "TRUE" (ST92, YES), communication controller 14 sets this indicator flag 142 to "FALSE" (ST93). Then, all of the process pending indicator flags of application programs, each of which indicates suspension or pending (i.e., all of the process pending indicator flag are "TRUE") in application program management table 145, are set to "FALSE" (ST94), and the process pending condition is cancelled.

Thereafter, the request-sending application program which has requested the processing is informed of the success of the process request and the cancellation of the exclusive process mode (ST95).

When the exclusive process mode has already been cancelled at the time of receiving the information of success of the process request, the application program is also informed of the success of the process request similarly.

Figure 10:
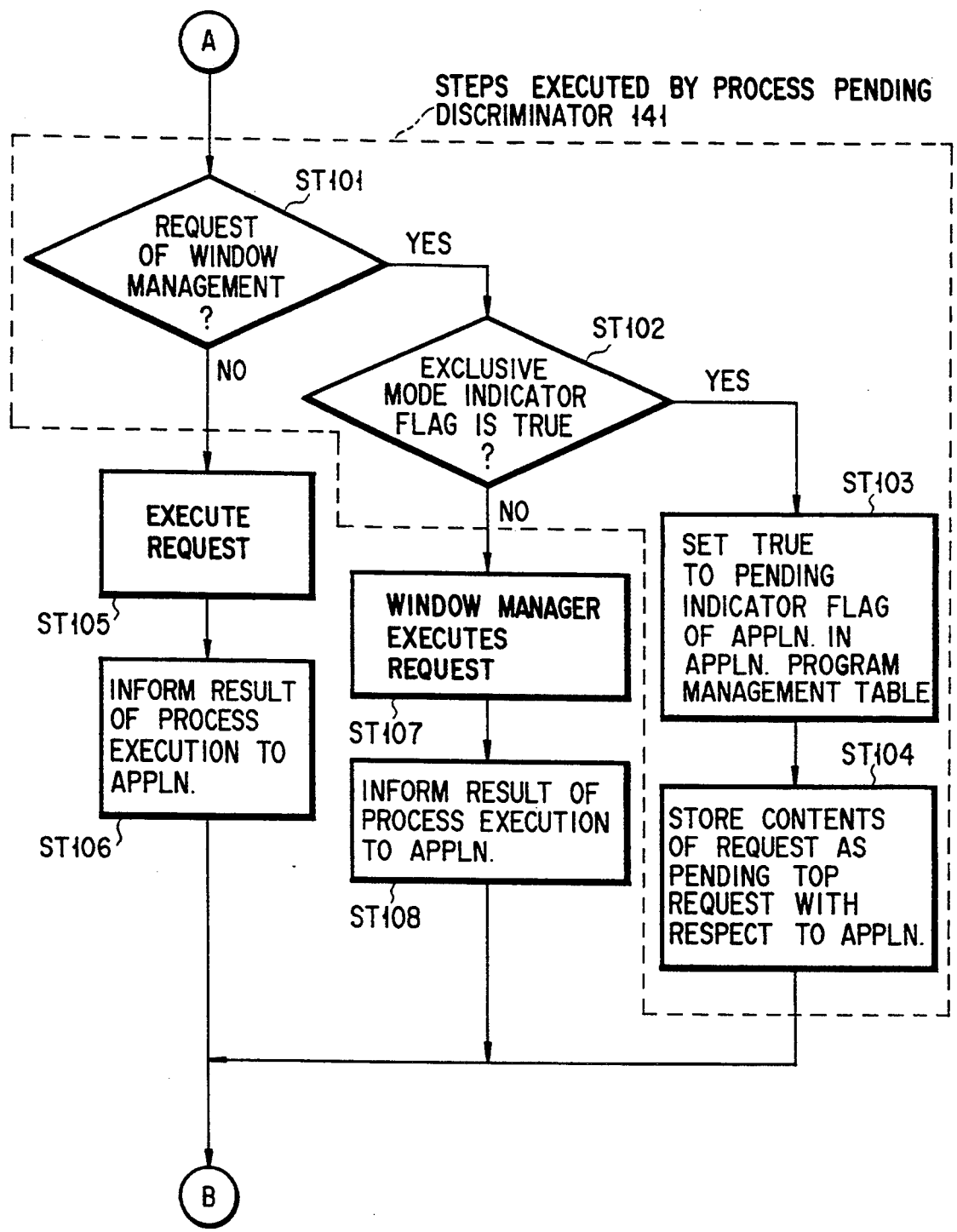
FIG. 10 is a flow chart for explaining an essential part of a process flow with respect to each request generated in the exclusive process mode.

FIG. 10 shows a flow of the process request executed in the exclusive process mode.

In the exclusive process mode, i.e., when exclusive mode indicator flag 142 is set to "TRUE" (ST101, YES; ST102, YES), and if the process request from an application program with respect to the window management is received, communication controller 14 sets to "TRUE" the process pending indicator flag in application program management table 145 corresponding to that application program (ST103).

At this time, the content of the receiving process request to be suspended or pending is sent to and stored in the corresponding item of application program management table 145, i.e., the column of the request for the top of pending process, without any modification (ST104).

The above-mentioned content stored in the column of the request for the top of pending process is not processed until the suspension or pending of the process of the corresponding application program is cancelled, and this content is processed or executed first (ST107) at the time when the suspension is cancelled (ST102, NO). Thus, so long as the processing of this content is suspended or pending, other request(s) from other application program(s) generated thereafter is(are) also not executed and suspended (stored).

More specifically, the process request(s) sent from application program(s) is(are) stored in communication buffer 144 unless communication controller 14 reads and analyzes it(them). After the suspension or the pending of processing is cancelled (ST102, NO), after the content of the process stored in application program management table 145 is executed (ST107), and after a process request is received from the application program whose suspension or pending condition is to be cancelled (ST108), the process request generated by the application program during its suspension period is read from communication buffer 144.

If communication buffer 144 becomes filled with the process requests from application programs and buffer 144 cannot store further received process request, communication controller 14 can no longer receive any process request from application program(s) (ST101, NO). In this case, the application program detects an error in transmitting the process request (ST105), and the process request is re-transmitted (ST106).

As mentioned above, according to the embodiment of the present invention, the process request(s) generated during the period of pending the application program(s) will not be lost, and the order of receiving the process requests can be made the same as that of generating these process requests.

Figure 11:
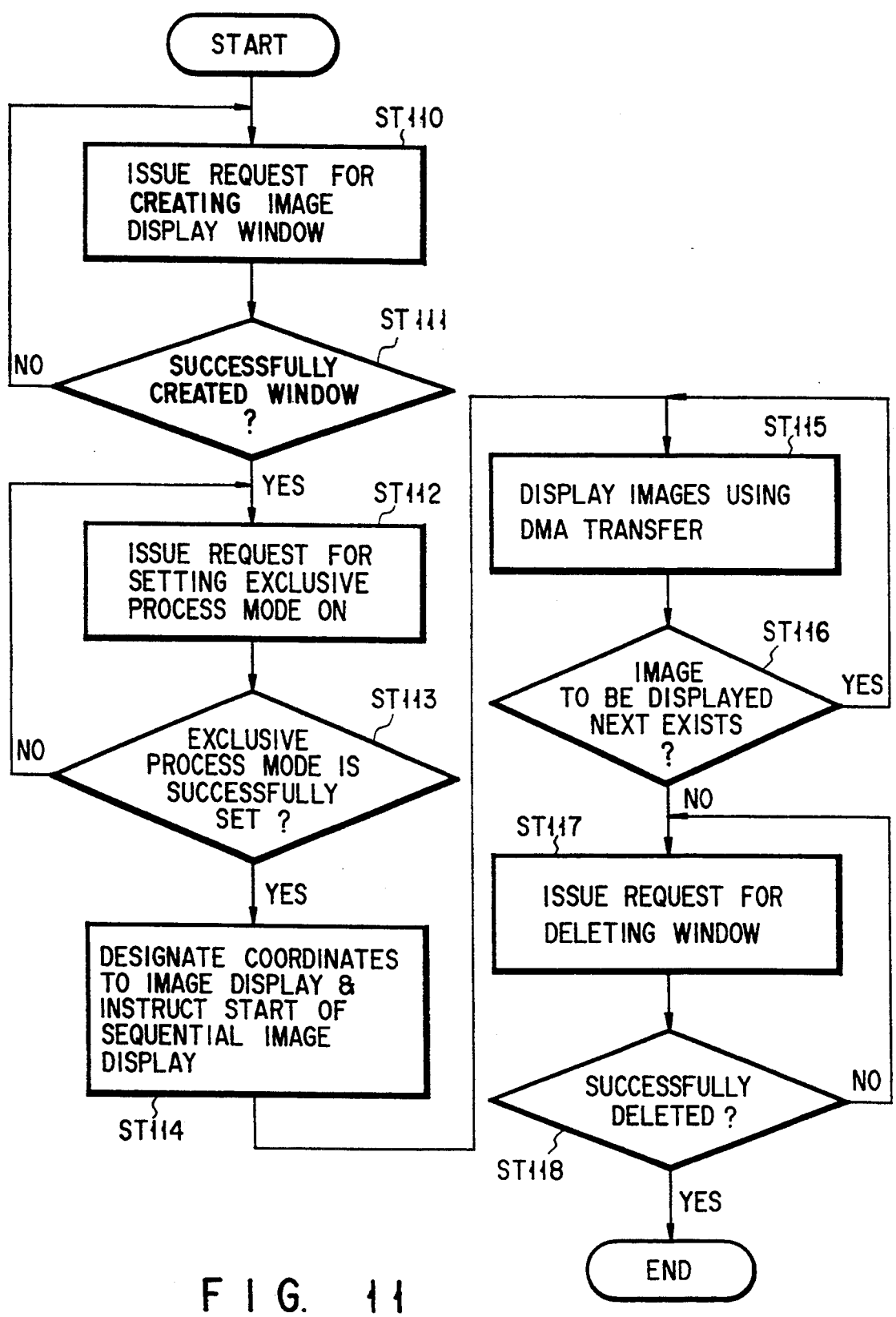
FIG. 11 is a flow chart for explaining an essential part of a process flow of an application program for achieving the sequential image display (page flipping)

FIG. 11 shows a flow of the process performed by sequential image display (page flipping) application program 13.

Application program 13 performs a high speed image data transfer from optical disk OD 27 to CRT 22 so as to enable sequential display processing like page flipping, using the image data transferring function achieved by the exclusive process mode and DMA 24.

First, sequential image display (page flipping) application program 13 sends to communication controller 14 a request for preparing an image display window (ST110).

Communication controller 14 analyzes the image display window preparing request (process request). If the result of the analyzation indicates that exclusive mode indicator flag 142 is set at "FALSE", communication controller 14 sends this process request to window manager 16.

Window manager 16 prepares a specific window under the environment designated by application program 13. If the preparation process of the specific window is successfully completed, communication controller 14 is informed of this successful completion.

Thereafter, when sequential image display application program 13 receives the result of processing from communication controller 14, this program confirms that the preparation of the window is successfully completed (ST111, YES).

When the window is prepared for an image display, sequential image display application program 13 sends to communication controller 14 a request for turning-on the exclusive process mode setting (ST112).

At the time of receiving the process request, if the mode is set at OFF (or FALSE) (ST113, NO), communication controller 14 sets the exclusive process mode to "TRUE" as has been mentioned earlier (ST112), and application program 13 is informed of the success of processing (ST113, YES).

After the exclusive process mode is set as mentioned above, sequential image display application program 13 sends to image display 15 the information regarding the image display area on CRT 22 (ST114).

As has been mentioned earlier, image display 15 performs high speed transferring of many image data items stored in optical disk OD 27 to display memory DM 23 using DMA 24 (ST115). Then, a sequential image display such as page flipping of the many image data items is performed in the image display window on CRT 22 (ST116, YES; ST115).

Thus, during the image data transfer by DMA 24, the exclusive process mode is set ON, so that the management information with respect to other windows is not changed or modified by other application programs, thereby achieving the sequential image display in the currently active image display window.

Figure 12:
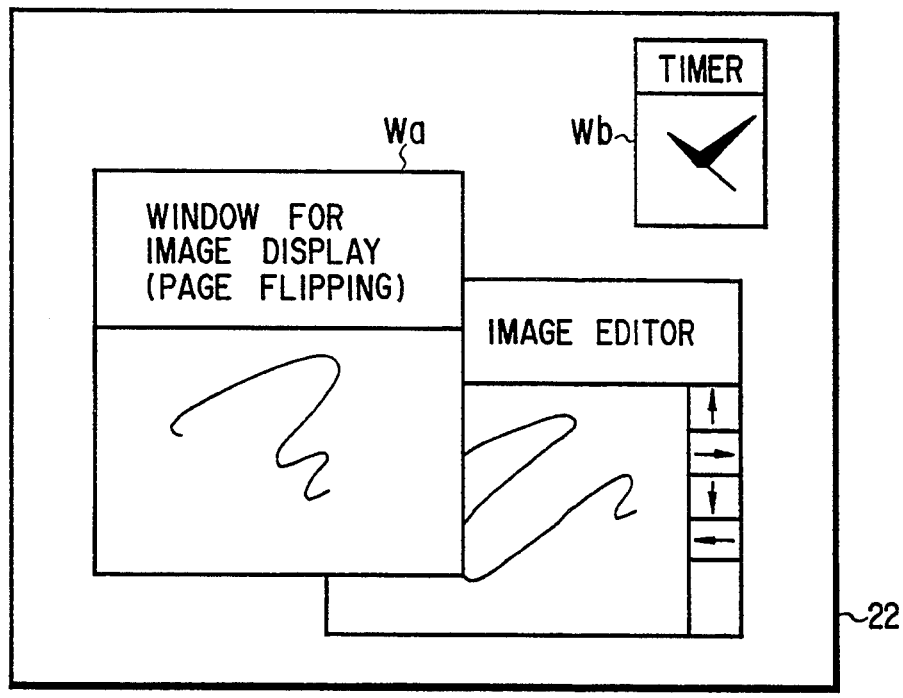
FIG. 12 shows an example of a display screen for the page flopping.

Even during the high speed sequential image display in the image display window, other graphics drawing in the currently displayed other windows is not affected at all. For instance, as shown in FIG. 12, when timepiece Wb as well as image display window Wa are displayed at the same time on CRT 22, even if sequential image displaying is performed in image display window Wa, the needles of timepiece Wb can continue to move.

When the image to be finally displayed is displayed (ST116, NO in FIG. 11), image display 15 stops the DMA transfer, and sequential image display application program 13 is informed of the completion of the image transferring.

When the information of completion of the image transferring is received, application program 13 sends to communication controller 14 a process request for turning-off the setting of the exclusive process mode (ST117).

In communication controller 14, the exclusive process mode is cancelled, and the process request of the pending application program is processed. Then, sequential image display application program 13 is informed of the success of cancelling process of the exclusive process mode (ST118, YES).

Sequential image display application program 13 having been informed of the success of cancelling process of the exclusive process mode sends to communication controller 14 a process request for erasing the image display window. After successfully erasing the window, application program 13 is terminated.

As mentioned above, an effective data transfer can be achieved with no care of a user.

More specifically, after a request for changing or modifying the display environment of a window is received from other application program(s) under the condition that the exclusive process mode is set, all process requests from the application program(s) are suspended. Then, it is possible to protect the management information regarding other window(s) from being modified by other application program(s), etc., during the DMA image data transferring. Therefore, it is possible to effectively perform a high speed image drawing such as a page flipping display with high speed data transferring, with no influence to the window display environment.

Incidentally, although in the above-mentioned embodiment (the first embodiment) the exclusive processing is executed when requests for all of the displayed windows are received, the present invention should not be limited to such an embodiment. For instance, the present invention can be applied to a second embodiment wherein the exclusive processing is executed only when a request for the uppermost-level (top side) displayed window is received.

Figure 14:
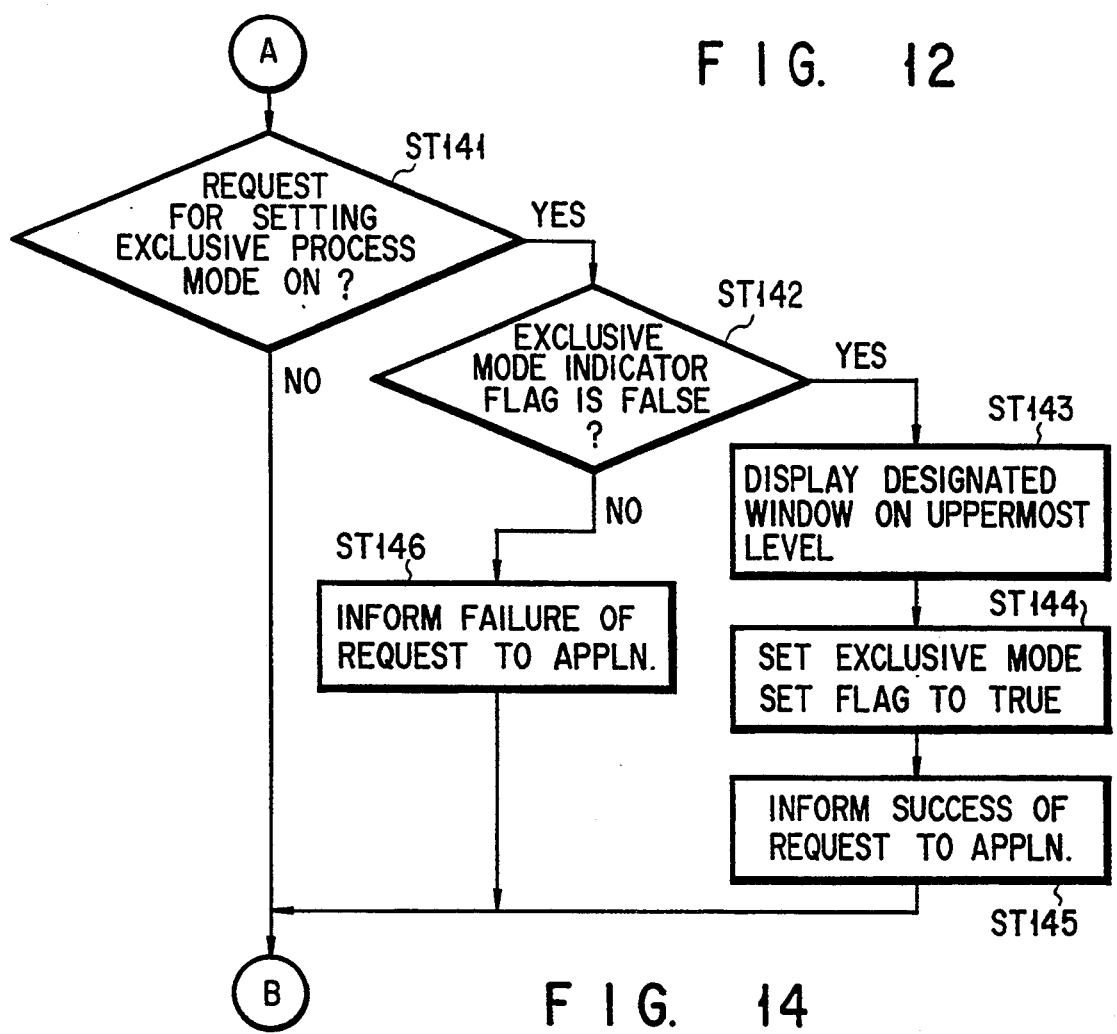
FIG. 14 is a flow chart for explaining an essential part of a process flow of the exclusive process mode setting.

A schematic software configuration of that case (the second embodiment) is shown in FIG. 13. FIG. 14 shows a flow of processing of this embodiment at the time of the start of the exclusive process mode. The flow of processing at the time of the end of the exclusive process mode may be one as has already been mentioned.

Steps ST141, ST142, ST144, ST145, and ST146 in FIG. 14 are respectively corresponding to ST81, ST82, ST83, ST84, and ST85 in FIG. 8 which has already been explained. Note that in the process of FIG. 14, a process (ST143) for displaying the designated window at the uppermost level of the display screen is provided between steps ST142 and ST144.

On the other hand, in the process of FIG. 15, when a request regarding the window management is generated (ST151, YES), exclusive mode indicator flag 142 is checked. If this flag is set at "TRUE" (ST152, YES), it is checked whether or not the management information of the uppermost window is changed or modified.

When the management information of the uppermost window is changed or modified (ST153, YES), or if a window is set to be the uppermost window (ST154, YES) even though this management information is not change or modified (ST153, NO), the process pending indicator flag in application program management table 145 (the flag of the currently active application program) is set to "TRUE" (ST155). Thereafter, communication controller 14 stores the content of the request of step ST151 as the request for the top of the pending process corresponding to the application program (ST156).

When no modification is made in the uppermost window management information (ST153, NO), and if none of windows is set to the uppermost level (ST154, NO), the process (corresponding to the request of step ST151) for renewing window management table 161 is executed (ST157), and the application program is informed of the result of execution of this process (ST158).

The exclusive processing may be executed only when a request with respect to an optional window (the target window of exclusive processing) which has been designated by an application program is received.

The above case is a third embodiment of the present invention of which software configuration is schematically shown in FIG. 16. An example of the configuration of exclusive process designation window table 163 is shown in FIG. 17. FIG. 18 shows a flow of processing when the ON of an exclusive mode is requested, and FIG. 19 shows a flow of processing when the suspension or pending of process is generated.

Steps ST181 to ST186 in FIG. 18 are respectively corresponding to steps ST141 to ST146 in FIG. 14 which has already been explained.

Figure 19:
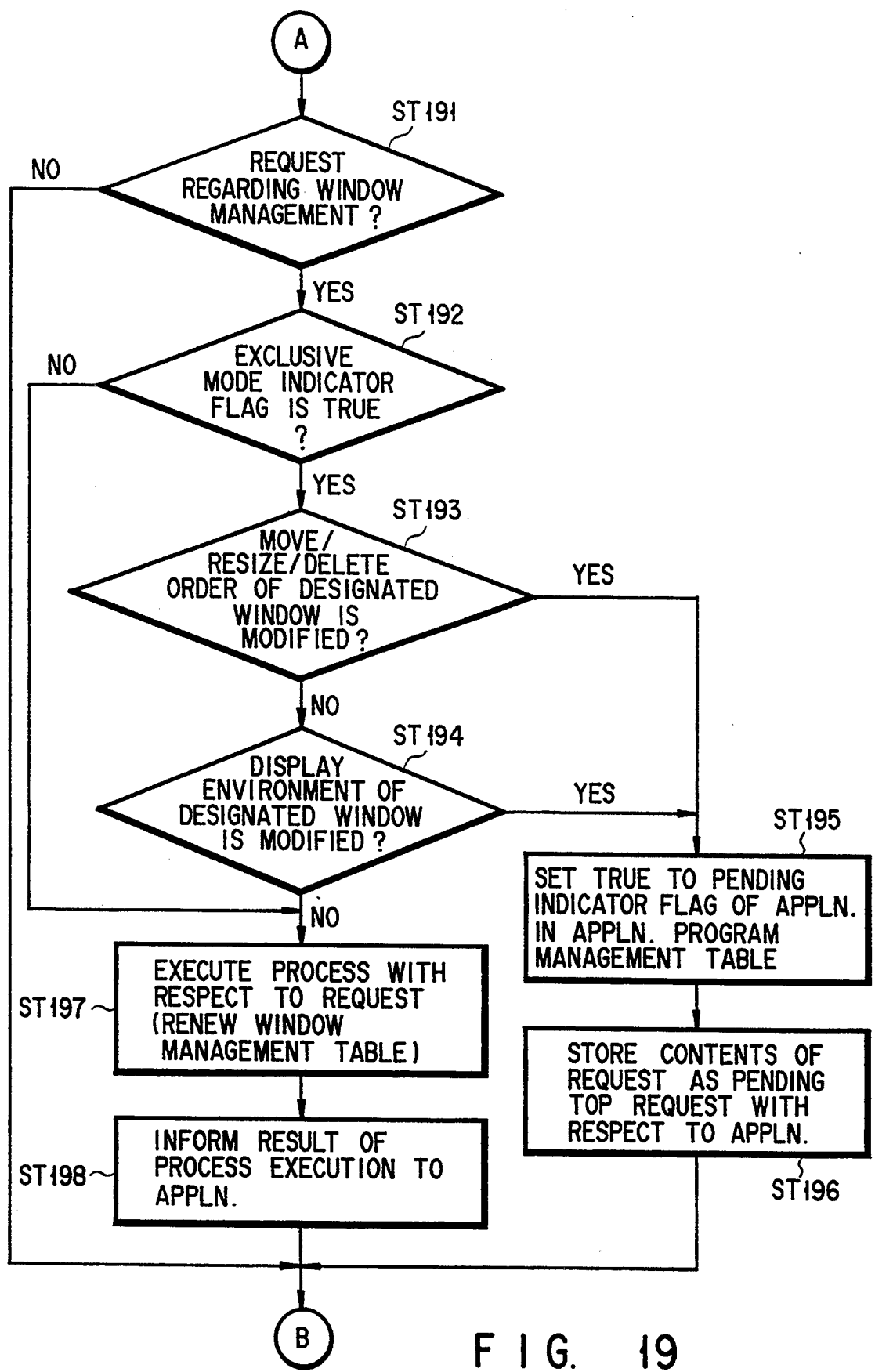
FIG. 19 is a flow chart for explaining a process flow in the exclusive process mode.

Further, steps ST191 to ST198 in FIG. 19 are respectively corresponding to steps ST151 to ST158 in FIG. 15 which has already been explained. Note that in step ST193 of FIG. 19, it is checked whether or not the order of the move/size change/erase processes of the designated window is changed, and in step ST194, it is checked whether or not the display environment of the designated window is modified.

More specifically, exclusive process designation window table 163 stores the identifier (window ID) of the window which may trigger the exclusive processing of the application program at the time when the ON of the exclusive mode is requested.

The above two embodiments (the second and third embodiments) are more effective than the former embodiment in that a request with respect to the display environment of window(s), other than those designated as the target of the exclusive processing, is normally processed.

Figure 20:
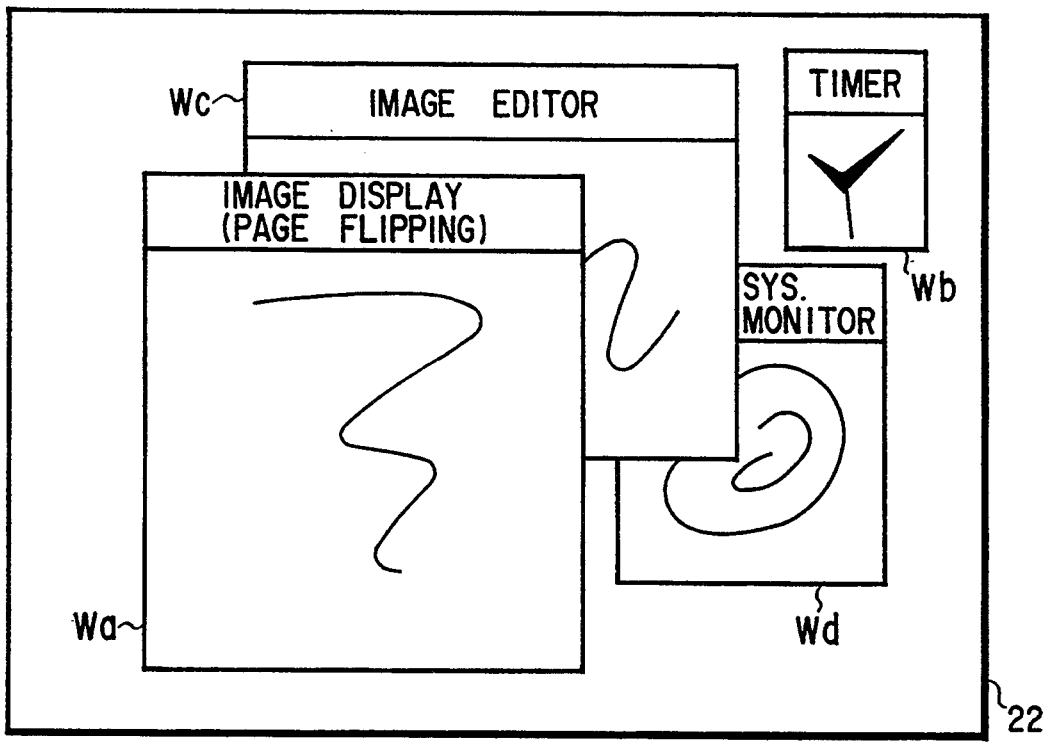
FIG. 20 shows an example of the display screen obtained by the second and third embodiments.
Figure 21:
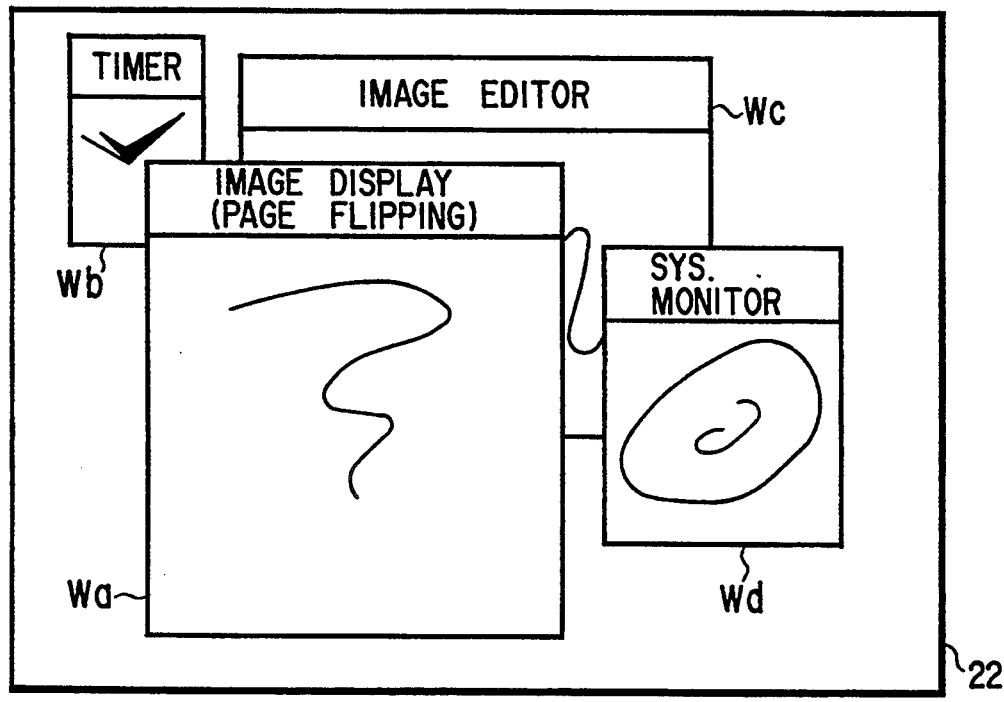
FIG. 21 shows an example of the display screen obtained when the position and/or the order of overlapping of the windows which are not the subject of the exclusive processing is changed or modified.

For instance, as shown in FIGS. 20 and 21, when image display (page flipping) window Wa is designated as the target of the exclusive processing, it is possible to freely change the display position of timepiece window Wb and/or the overlapping order of system monitor window Wd, thus improving the operability of the multiwindow system.

Now a fourth embodiment of the present invention having the above-mentioned configuration will be explained.

Figure 22:
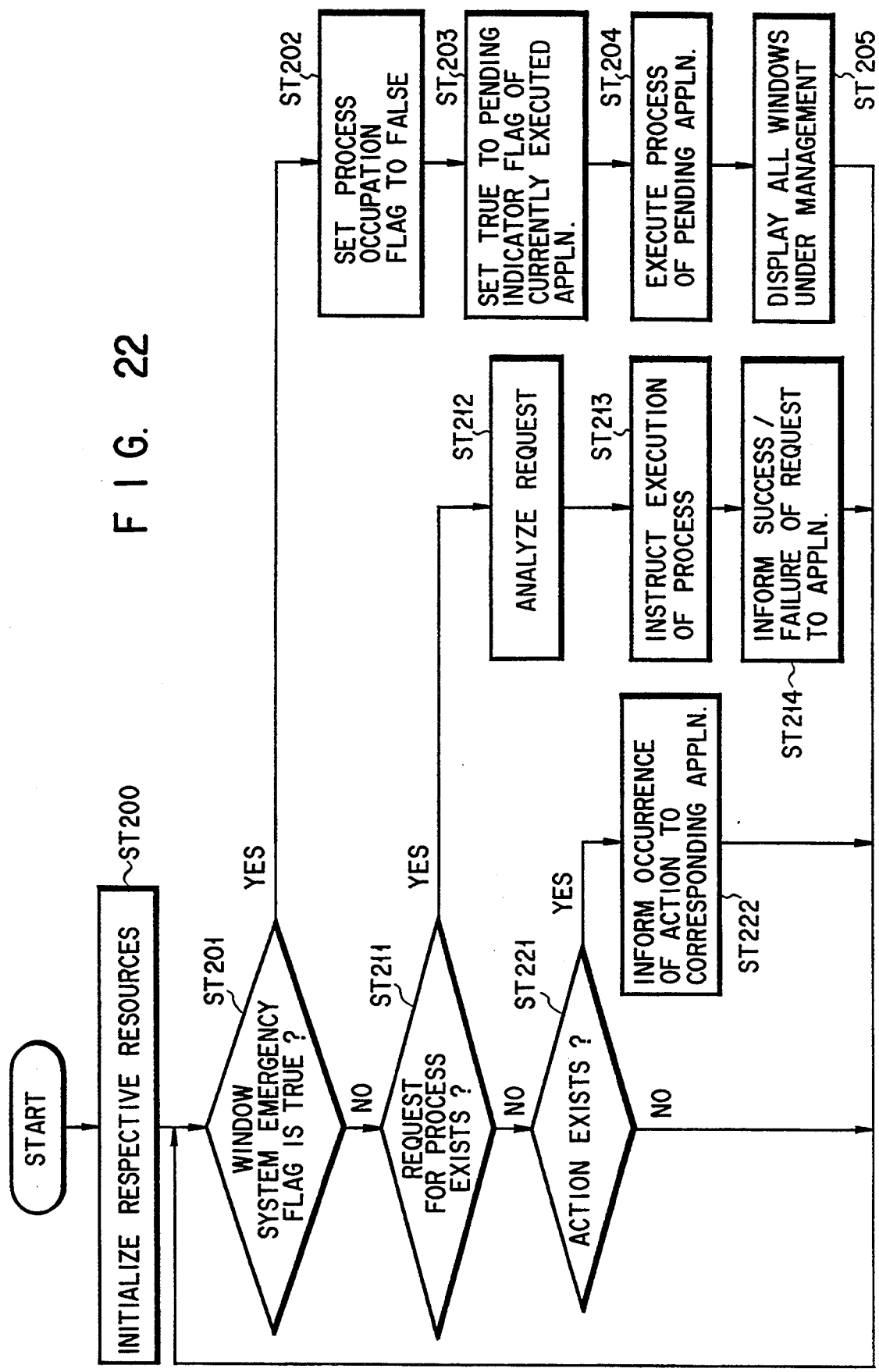
FIG. 22 is a flow chart for explaining a basic process flow of the communication controller used in a fourth embodiment of the present invention.

FIG. 22 shows a schematic flow of processing the process request generated by an application program.

When respective resources such as tables and flags are initialized (ST200), communication controller 14 checks the content of window system emergency flag 146. If flag 146 is set at "FALSE" (ST201, NO), it is determined that the current condition is abnormal, and communication controller 14 waits for receiving a process request from an application program. (ST211, NO; ST221, NO).

When a process request is sent from the application program (ST211, YES), communication controller 14 refers to application program management table 145 and checks whether or not the process request is generated by the application program whose process request is suspended (ST212).

When the process pending indicator flag of that application program in application program management table 145 is set at "TRUE", communication controller 14 does not analyze the process request and stores it to communication buffer 144. Then, communication controller 14 waits for a subsequent process request.

If the process pending indicator flag in application program management table 145 is set at "FALSE", request analyzer 143 in communication controller 14 analyzes the content of the received process request (ST212). Here, it is determined whether the process request relates to a window management, to graphics drawing (including character drawing), or to input device control.

Thereafter, depending on the result of the analyzation, communication controller 14 sends to window manager 16 the process request with respect to a window management, to graphics drawing engine 17 the process request with respect to graphics drawing, or to mouse/keyboard input controller 18 the process request with respect to input device control (ST213).

When the part which receives the process request is instructed to execute the process request, this part sends the result of processing to communication controller 14. According to this result, communication controller 14 detects whether or not the requested process is successfully completed. Then, the application program which has generated the process request is informed of whether or not the requested process is successfully completed (ST214).

After completing the notice of the result of processing to the request-sending application program, communication controller 14 waits for a subsequent new process request.

In the above case, there is no need to sequentially operate communication controller 14, window manager 16, graphics drawing engine 17, and mouse/keyboard input controller 18; they may be operated independently, except that they have to synchronously operate.

Application programs 11 to 13 can independently operate, and the number of the programs to be connected to communication controller 14 is variable. The maximum number of these programs depends on the memory area size available to application program management table 145, and on the communication capacity of the whole system of the embodiment. This maximum number is determined at the time of system initialization.

On the other hand, when window system emergency flag 146 is set at "FALSE" (ST201, NO) while no process request is generated by any application program (ST221, NO), communication controller 14 waits for an input event generated by the action of the mouse and/or the keyboard.

When there is no action of the mouse/keyboard, communication controller 14 waits for receiving a subsequent new process request. If an action thereof has occurred (ST221, YES), the application program is informed of the occurrence of the action (ST222) and, then, communication controller 14 waits for receiving a subsequent new process request.

If window system emergency flag 146 is set at "TRUE" (ST201, YES), it is determined that an abnormal condition (emergency matter) has occurred, so that exclusive mode indicator flag (process occupation flag) 142 is set to "FALSE" (ST202).

Thereafter, application program management table 145 is referred to, and the process pending indicator flag of the currently executed application program is set to "TRUE" (ST203).

At this time, the process pending indicator flag in application program management table 145 is set at "TRUE" so that the process corresponding to the request from the application program whose process has been suspended is executed (ST204), and all of the managed windows are simultaneously displayed on the screen of CRT 22 (ST205).

At the time of occurring an emergency matter, such an emergency matter may be handled by the above simultaneous display of all of the managed windows on the screen of CRT 22.

Figure 23:
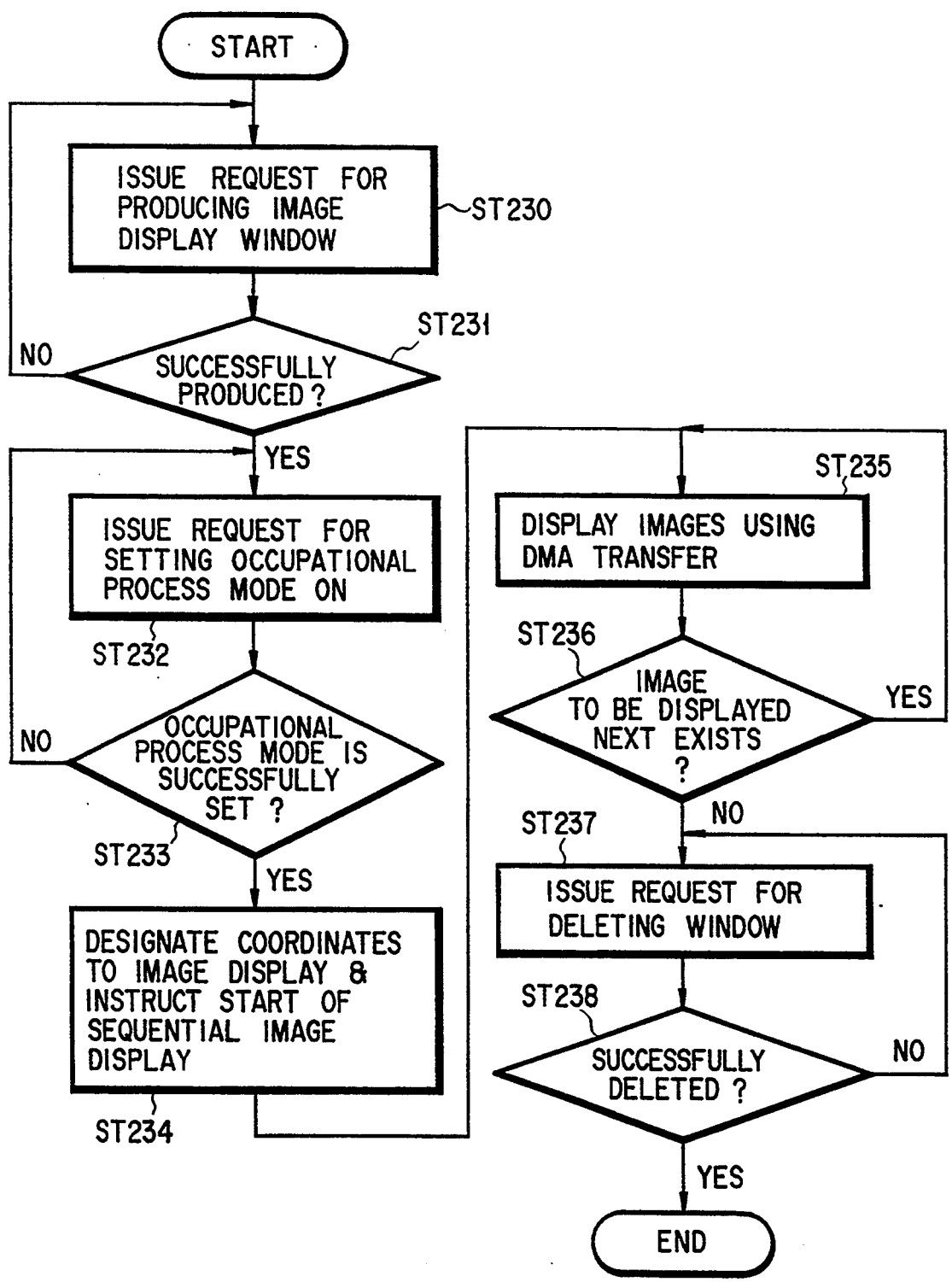
FIG. 23 is a flow chart for explaining a process flow of an application program for achieving the sequential image display (page flipping)

FIG. 23 shows a flow of processing of sequential image display (page flipping) application program 13.

Application program 13 utilizes the aforementioned occupation process mode and the image data transferring function of DMA 24, so that image data is high-speed transferred from optical disk OD 27 to CRT 22, and the images of the transferred data is sequentially displayed like page flipping.

More specifically, sequential image display (page flipping) application program 13 sends to communication controller 14 a request for preparing a display window (ST230).

In communication controller 14, the content of this request is analyze and, if exclusive mode indicator flag 142 in communication controller 14 is set at "FALSE", this process request is sent to window manager 16.

Window manager 16 prepares a window with the environment (conditions) designated by application program 13. When the window preparation processing is successfully completed (ST231, YES), communication controller is informed of this successful completion.

After receiving the result of processing from communication controller 14, sequential image display application program 13 confirms that the window is successfully prepared.

After the image display window has prepared, sequential image display application program 13 sends to communication controller 14 a request for turning ON the occupation process mode (ST232).

If the occupation process mode is OFF (FALSE) at the time when the process request is received, communication controller 14 sets the occupation process mode (TRUE), and application program 13 is informed of the success of processing.

When the occupation process mode is set as mentioned above (ST233, YES), sequential image display application program 13 sends to image display 15 the information with respect to the image display area on CRT 22 (ST234).

As has been mentioned earlier, image display 15 performs the processing of high speed transfer of many image data items from optical disk OD 27 to display memory DM 23, using DMA 24 (ST235). Then, images are sequentially displayed in the image display window on CRT 22, like a page flipping manner.

During the image data transferring by DMA 24, since the occupation process mode is set at ON, the management information of other window(s) is protected from being modified by other application program(s) or the like. Thus, images are sequentially displayed within the current image display window.

Figure 24:
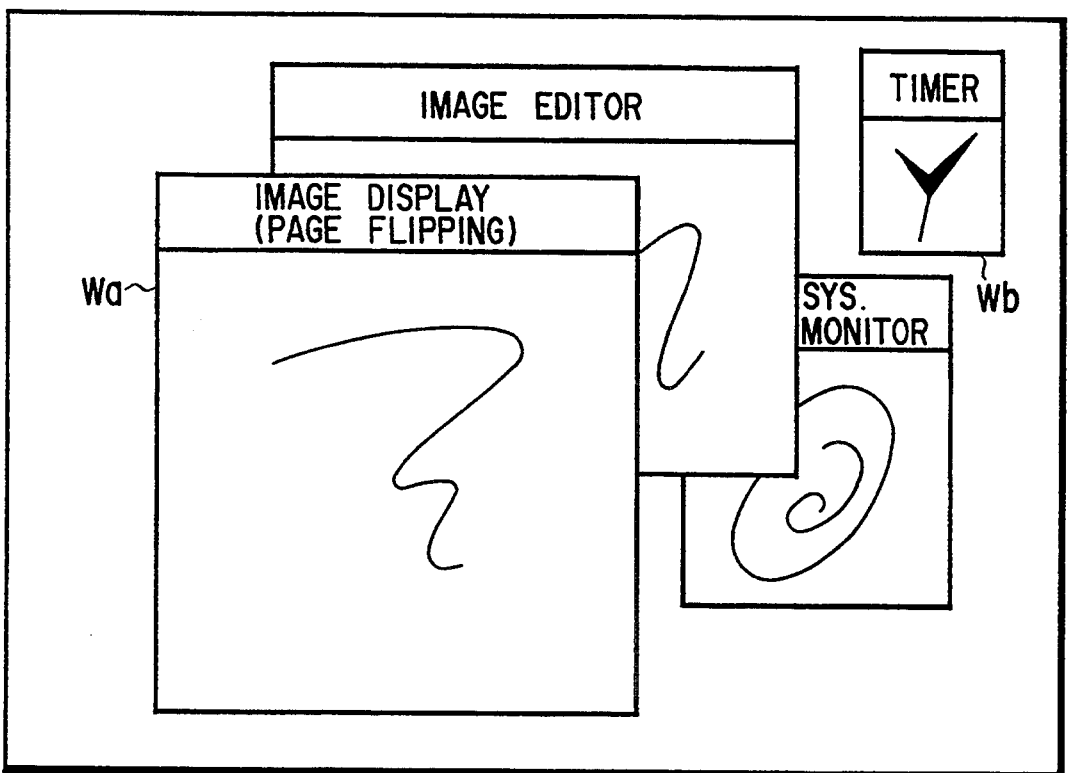
FIG. 24 shows an example of a display screen for the page flopping.

Even during the period of performing a high speed sequential image display in the image display window, graphics drawing in other displayed window is not affected at all. For instance, as shown in FIG. 24, when timepiece Wb is displayed on CRT 22 in addition to image display window Wa, the needle of timepiece Wb can move even if images are sequentially and currently displayed in window Wa.

When the last image to be finally displayed is displayed (ST236, NO), image display 15 stops the DMA transfer, and sequential image display application program 13 is informed of the completion of the image transferring operation.

After application program 13 has been noticed the completion of the image transferring operation, it sends to communication controller 14 a process request for setting OFF the occupation process mode.

In communication controller 14, the occupation process mode is cancelled (or set to FALSE), and the process request of the process-pending application program(s) is executed. Then, sequential image display application program 13 is notified that the occupation process mode is successfully cancelled.

Sequential image display application program 13, having been informed of the success of cancellation of the occupation process mode, sends to communication controller 14 a process request for erasing the image display window (ST237). When the window is successfully erased (ST238, YES), sequential image display application program 13 is terminated.

FIG. 25 shows a flow of processing performed in an emergency case.

First, assume that system management (monitoring) program 30 runs at the time of the system initialization. System management program 30 sets window system emergency flag 146 to "FALSE" (ST250).

Then, respective conditions of the system (e.g., the condition of the memory, the state of the network connection, and so on) are confirmed by program 30 (ST251). If no abnormal condition has occurred (ST252, NO), program 30 sleeps for a predetermined period of time (ST253) and, then, confirms the conditions again. Thus, according to this embodiment, various system conditions are periodically monitored by system management program 30.

If system management program 30 detects an abnormal state in the system (ST252, YES), program 30 sets "TRUE" to window system emergency flag 146 (ST254). Thereafter, program 30 inquires to image display 15 whether or not image data is currently transferred (ST255). If DMA transfer processing for image data is currently performed (ST256, YES), program 30 sends an instruction to image display 15 so as to compulsorily interrupt the image transfer processing (ST257).

System management program 30 also sends to communication controller 14 a process request for preparing and displaying a window and for outputting an error message in this window (ST258). At this time, the content of the error message is also sent and, then, system management program 30 is terminated.

When the window display processing requested by system management program 30 is received by communication controller 14, controller 14 has already detected the "TRUE" of window system emergency flag 146 and the occupation process mode has already been cancelled.

Figure 26:
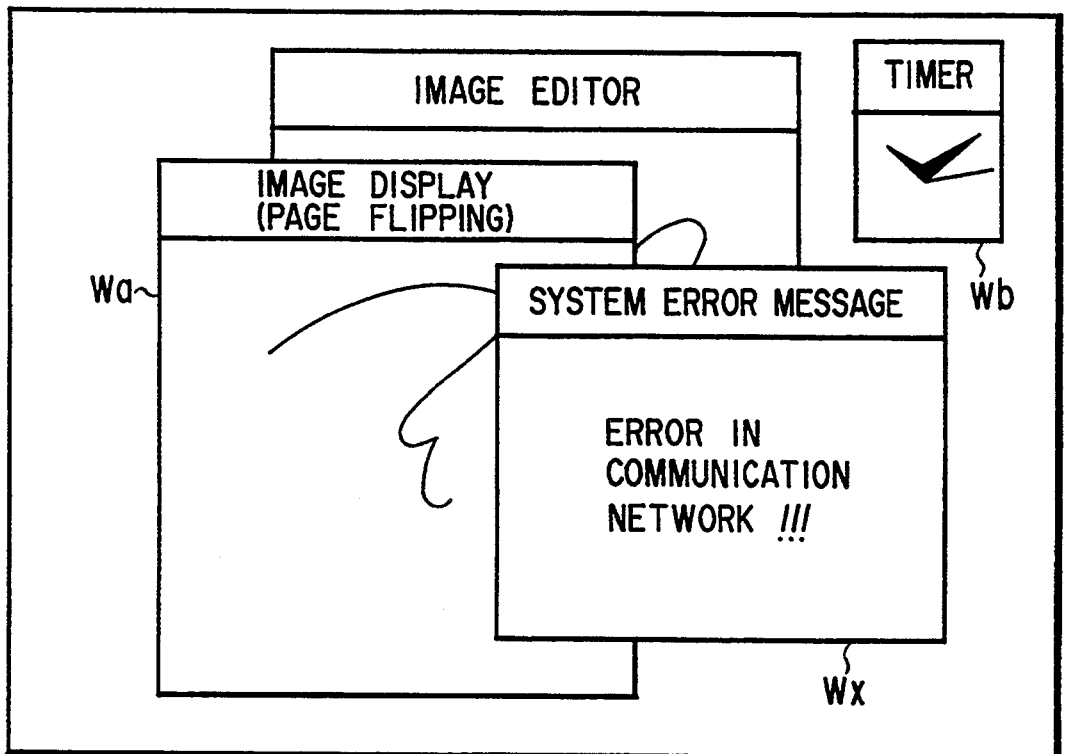
FIG. 26 shows an example of a display screen obtained when unrecoverable error occurs in a network communication during the page flipping display.

Then, error message display window Wx is prepared by window manager 16 as shown in FIG. 26, and the message data is displayed by graphics drawing engine 17 on the screen of CRT 22, with no problem.

For instance, if an abnormal system condition has occurred during sequential image display application program 13 executes the page flipping display, the image transferring process of application program 13 is interrupted by image display 15, and the request for displaying a window on the screen is suspended by communication controller 14.

Incidentally, FIG. 26 exemplifies a displayed image wherein an unrecoverable error has occurred in the network communication during the page flipping display.

As mentioned above, if an emergency matter (e.g., system error) has occurred, such an emergency matter can be displayed with the top priority.

More specifically, if window system emergency flag 146 becomes "TRUE", the occupation processing mode is cancelled, and the priority of displaying the emergency matter is set higher than that of the display request from a currently executed application program(s). Therefore, a user of the apparatus can quickly take a suitable countermeasure to the occurrence of an emergency matter, without affecting the window display using high speed data transferring. Thus, an effective multiwindow environment can be obtained even in the case of high speed image drawing such as page flipping display.

Incidentally, according to the present invention, there is no necessity to integrate all components of the apparatus in one terminal unit. For instance, these components may be distributed over many display terminals coupled via network communication. The present invention can of course be embodied in various ways without departing from the scope of the invention.

As has been mentioned above, according to the present invention, it is possible to provide an information display apparatus having an easy-to-use multiwindow system by which high speed image drawing required to a page flipping display or the like can be achieved while keeping a high operability of the multiwindow.

In addition, according to the present invention, it is possible to complete the countermeasure to an error occurring when a specific application program occupies the window manager, thereby properly handing an emergency matter.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A display apparatus comprising:
   display means for displaying data, said display means having a display area for displaying data;
   first instructing means for instructing said display means to perform a first process request, wherein said first process request entails displaying data on said display area;
   second instructing means for instructing said display means to perform a second process request, wherein said second process request entails modifying a display condition of said display area, said display condition being specified by at least one of the size of said display area and the position of said display area;
   first executing means for executing the function of said first process request to said display means;
   means for prohibiting a modification of the display condition of said display area when said second instructing means instructs said display means to perform said second process request while said first executing means executes said first process request;
   means for storing a content of said second process request when said prohibiting means prohibits the modification of the display condition of said display area; and
   second executing means for executing the function of said second process request stored in said storing means when the function of said first process request completes.

2. A display apparatus according to claim 1, wherein said display means further comprises:
   multiwindow display means for displaying first and second windows in response to requests from said first and second instructing means, said multiwindow display means including:
   means for displaying the first window in response to the request from said first instructing means; and
   suspending means for suspending the function of the second process request when the second process request is received from said second instructing means, so as to maintain the display condition of the first window.

3. A display apparatus according to claim 2, further comprising:
   mode set means for setting a mode which determines whether or not said suspending means is active, wherein said suspending means is able to suspend the second process request from said second instructing means only when it is active; and
   means for causing said suspending means to perform its suspending function only if the mode set by said mode set means allows said suspending means to be active.

4. A display apparatus according to claim 3, further comprising:
   means for allowing a change to the mode set by said mode set means in response only to the first process request from said first instructing means.

5. A display apparatus according to claim 3, further comprising:
   means for stopping the suspending function of said suspending means in response only to the first process request from said first instructing means; and
   means for executing the function of the second process request from said second instructing means when the suspending function is stopped by said stopping means.

6. A display system comprising:
   display means for displaying data, said display means having a display area for displaying data;
   first storing means for storing data to be displayed, said first storing means being coupled to said display means so as to directly supply data to said display means;
   first instructing means for instructing said display means to perform a first process request, wherein said first process request entails displaying data stored in said first storing means on said display area;
   second instructing means for instructing a second process request to said display means, wherein said second process request is capable of modifying a display condition of said display area, said display condition being specified by at least one of the size of said display area and the position of said display area;

first executing means for executing said first process request and for providing information, indicative thereof, to said display means;

means for prohibiting a modification of the display condition of said display area when said second instructing means instructs said second process request while said first executing means executes the function of said first process request;

second storing means for storing a content of said second process request when said prohibiting means prohibits the modification of the display condition of said display area; and second executing means for executing a function of said second process request stored in said second storing means when the function of said first process request completes.

7. A display apparatus comprising:

display means for displaying first and second windows which display data;

first instructing means for instructing said display means to perform a first process request, wherein said first process request entails displaying data on said first window;

second instructing means for instructing a second process request to said display means, wherein said second process request is capable of modifying a display condition of said first and second windows, said display condition being specified by at least one of the size of said first and second windows and the position of said first and second windows;

first executing means for executing a function of said first process request and providing information, indicative thereof, to said display means;

means for prohibiting a modification of the display condition of said first and second windows when said second instructing means instructs said second process request while said first executing means executes the function of said first process request;

means for storing a content of said second process request when said prohibiting means prohibits the modification of the display condition of said first and second windows; and second executing means for executing a function of said second process request stored in said storing means when the function of said first process request completes.

8. A display apparatus according to claim 7, further comprising:

means for modifying the display condition of said first window by changing a position of said first window, changing a size of said first window, changing an order of overlapping between said first window and said second window, generating a third window, or deleting at least said first window from said display means.

9. A display apparatus according to claim 7, further comprising:

means for checking whether said first window is displayed on an uppermost level of stacked windows including said first and second windows, so as to provide a result of said checking; and means for stopping the function executed by said first executing means if the result of said checking indicates that said first window is not displayed on the uppermost level.

10. A display apparatus according to claim 7, further comprising:

means for checking whether said first window is displayed on an uppermost level of stacked windows including said first and second windows, so as to provide a result of said checking; and means for causing said first window to be the uppermost level and causing said first executing means to execute said first process request if the result of checking indicates that said first window is not displayed on the uppermost level.

11. A display apparatus comprising:

display means for displaying data, said display means having a display area for displaying a window;

first instructing means for instructing said display means to perform a first process request, wherein said first process request entails displaying data on said window and prohibiting a modification of a display condition of said window, said display condition being specified by at least one of the size of said window and the position of said window;

second instructing means for instructing a second process request to said display means, wherein said second process request entails displaying operable time data on said display area;

first executing means for executing said first process request and for providing information, indicative thereof, to said display means; and second executing means for executing said second process request so as to display time data on said display means while said first executing means executes said first process request.

12. A display apparatus comprising:

display means for displaying data, said display means having a display area for displaying data;

means for instructing said display means to perform a process request, wherein said process request causes said display means to display data on said display area and causes said display means to prohibit the modification of a display condition of said display means;

first executing means for executing said process request and for providing information, indicative thereof, to said display means;

means for detecting that an error has occurred at said display apparatus;

means for suspending the performance of said process request to said display means so as to display an error message indicating a content of the error on said display area when said detecting means detects the error while said first executing means executes said process request;

second executing means for executing said process request suspended by said suspending means when the error is detected.

13. A display apparatus according to claim 12, wherein said suspending means includes means for storing a content of said process request when said suspending means suspends the function of said process request.

14. A display apparatus comprising:

display means for displaying a window which displays data;

first instructing means for instructing said display means to perform a first process request, wherein said first process request causes said display means to display data on said window and causes said display means to prohibit a modification of a display condition of said window, said display condition being specified by at least one of the size of said window and the position of said window;

second instructing means for instructing said display means to perform a second process request, wherein said second process request is capable of modifying the display condition of said window;

first executing means for executing said first process request and for providing information, indicative thereof, to said display means;

means for storing a content of said second process request so as to prohibit the modification of the display condition of said window when said second instructing means instructs said second process request while said first executing means executes said first process request;

means for detecting an error occurred at said display apparatus;

means for suspending the function of said first process request to said display means so as to display an error message indicating a content of the error when said detecting means detects the error while said first executing means executes said first process request; and second executing means for executing said second process request stored in said storing means when said display means displays the error message.

* * * * *